United States Patent
Konzelmann et al.

(10) Patent No.: US 12,170,816 B2
(45) Date of Patent: *Dec. 17, 2024

(54) ASSIGNING PRIORITY FOR AN AUTOMATED ASSISTANT ACCORDING TO A DYNAMIC USER QUEUE AND/OR MULTI-MODALITY PRESENCE DETECTION

(71) Applicant: GOOGLE LLC, Mountain View, CA (US)

(72) Inventors: Jaclyn Konzelmann, Mountain View, CA (US); Tuan Nguyen, San Jose, CA (US); Vinay Bettadapura, San Jose, CA (US); Andrew Gallagher, Fremont, CA (US); Utsav Prabhu, Pittsburgh, PA (US); Caroline Pantofaru, San Carlos, CA (US)

(73) Assignee: GOOGLE LLC, Mountain View, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/234,771

(22) Filed: Aug. 16, 2023

(65) Prior Publication Data

US 2023/0396841 A1    Dec. 7, 2023

Related U.S. Application Data

(63) Continuation of application No. 17/588,467, filed on Jan. 31, 2022, now Pat. No. 11,785,295, which is a
(Continued)

(51) Int. Cl.
*H04N 21/442*    (2011.01)
*G06T 7/70*    (2017.01)
(Continued)

(52) U.S. Cl.
CPC ......... *H04N 21/44218* (2013.01); *G06T 7/70* (2017.01); *H04N 21/25875* (2013.01);
(Continued)

(58) Field of Classification Search
CPC ....... H04N 21/44218; H04N 21/25875; H04N 21/25891; H04N 21/4126; G06T 7/70;
(Continued)

(56) References Cited

U.S. PATENT DOCUMENTS

| 8,200,868 B1 * | 6/2012 | 't Hooft | G06F 13/387 |
| | | | 710/72 |
| 10,621,444 B1 * | 4/2020 | Mirza | G06V 10/44 |

(Continued)

FOREIGN PATENT DOCUMENTS

| CN | 1591353 | 3/2005 |
| CN | 103959299 | 7/2014 |

(Continued)

OTHER PUBLICATIONS

Intellectual Property India; Examination Report issued in Application No. 202228060740, 7 pages, dated Jan. 9, 2023.
(Continued)

*Primary Examiner* — Timothy R Newlin
(74) *Attorney, Agent, or Firm* — Gray Ice Higdon

(57) ABSTRACT

Implementations relate to an automated assistant that provides and manages output from one or more elements of output hardware of a computing device. The automated assistant manages dynamic adjustment of access permissions to the computing device according to, for example, a detected presence of one or more users. An active-user queue can be established each time a unique user enters a viewing window of a camera of the computing device when, up to that point, no user was considered active. Multiple image frames can be captured via the camera and processed
(Continued)

to determine whether an initial user remains in the viewing window and/or whether another user has entered the viewing window. The initial user can be considered active as long as they are exclusively detected in the viewing window. Restricted content associated with the user may be rendered by the computing device whilst the user is active.

19 Claims, 12 Drawing Sheets

Related U.S. Application Data continuation of application No. 16/973,370, filed as application No. PCT/US2020/031566 on May 6, 2020, now Pat. No. 11,240,560.

(60) Provisional application No. 62/843,995, filed on May 6, 2019.

(51) Int. Cl.
H04N 21/258 (2011.01)
H04N 21/41 (2011.01)
H04W 12/64 (2021.01)

(52) U.S. Cl.
CPC ... *H04N 21/25891* (2013.01); *H04N 21/4126* (2013.01); *H04W 12/64* (2021.01); *G06T 2207/30196* (2013.01)

(58) Field of Classification Search
CPC ........ G06T 2207/30196; H04W 12/64; H04W 12/06; H04W 12/065; H04W 12/08; H04W 12/60; H04W 12/65; H04W 12/69; H04W 4/023; G06F 21/31; G06F 21/32; G06F 21/44; G06F 21/6245; G06F 9/4881; H04L 63/0861; H04L 63/107
See application file for complete search history.

(56) References Cited

U.S. PATENT DOCUMENTS

| | | | |
|---|---|---|---|
| 10,819,920 B1* | 10/2020 | Hamlin | G06F 1/1686 |
| 11,240,560 B2 | 2/2022 | Konzelmann et al. | |
| 2006/0093998 A1* | 5/2006 | Vertegaal | G06F 3/011 |
| | | | 705/7.29 |
| 2011/0072452 A1 | 3/2011 | Shimy et al. | |
| 2013/0201105 A1 | 8/2013 | Ptucha | |
| 2015/0195371 A1 | 7/2015 | Nowakowski | |
| 2017/0063852 A1* | 3/2017 | Azar | G06V 40/70 |
| 2017/0163829 A1 | 6/2017 | Fujioka | |
| 2017/0289766 A1* | 10/2017 | Scott | H04W 8/005 |
| 2018/0233139 A1 | 8/2018 | Finkelstein et al. | |
| 2018/0295420 A1* | 10/2018 | Rumreich | H04N 21/4532 |
| 2022/0159340 A1 | 5/2022 | Konzelmann et al. | |

FOREIGN PATENT DOCUMENTS

| | | |
|---|---|---|
| CN | 105556508 | 5/2016 |
| CN | 105700363 | 6/2016 |
| CN | 107391523 | 11/2017 |
| WO | 2018213322 | 11/2018 |

OTHER PUBLICATIONS

Intellectual Property India; Examination Report issued in Application No. 202127045298; 9 pages; dated Apr. 27, 2022.
European Patent Office; Invitation to Pay Additional Fees; PCT Ser. No. PCT/US2020/031566; 15 pages; dated Aug. 19, 2020.
European Patent Office; International Search Report and Written Opinion; PCT Ser. No. PCT/US2020/031566; 21 pages; dated Oct. 12, 2020.
China National Intellectual Property Administration; Notification of First Office Action issued in Application No. 202080034108.6; 15 pages; dated Jan. 5, 2024.
China National Intellectual Property Administration; Notice of Grant issued in Application No. 202080034108.6; 7 pages; dated Jun. 13, 2024.
European Patent Office; Examination Report issued in Application No. 20728320.1, 7 pages; dated Jun. 6, 2024.
Chishiro, H.; Study on Industrial robot Real-time Control software with Windows-based; 1 page; dated 2011.
Intellectual Property India; Hearing Notice issued in Application No. 202127045298; 2 pages; dated Aug. 19, 2024.

* cited by examiner

ASSIGNING PRIORITY FOR AN AUTOMATED ASSISTANT ACCORDING TO A DYNAMIC USER QUEUE AND/OR MULTI-MODALITY PRESENCE DETECTION

BACKGROUND

Humans may engage in human-to-computer dialogs with interactive software applications referred to herein as "automated assistants" (also referred to as "digital agents," "chatbots," "interactive personal assistants," "intelligent personal assistants," "conversational agents," etc.). For example, humans (which when they interact with automated assistants may be referred to as "users") may provide commands and/or requests using spoken natural language input (i.e., utterances) which may in some cases be converted into text and then processed, and/or by providing textual (e.g., typed) natural language input.

In some instances, an automated assistant may respond to a particular user according to whether a voice signature of the user corresponds to a restricted account that is accessible upon voice verification. However, as a number of users near an automated assistant device increases, background noise and other voices can be detected by the automated assistant, causing the automated assistant to lose track of whether the particular user is still present. This can be especially problematic when a particular user has been authenticated via voice verification but subsequently leaves a vicinity of the automated assistant device. As a result, a display panel of the automated assistant device may continue rendering restricted data that the particular authenticated user was accessing, despite the user no longer being present. Furthermore, when an automated assistant continues to render data for an initial user that has left a vicinity of the automated assistant device, such rendering can waste computational resources. Moreover, wasteful latency can be exhibited by the automated assistant device when another user enters the vicinity of the automated assistant device, but the automated assistant device continues rendering data with the expectation that the initial user is still present.

SUMMARY

Implementations set forth herein relate to control of computing hardware to render particular outputs. The particular outputs may be rendered by the computing hardware for particular authenticated users and may comprise access-restricted data. The computing hardware, which is discussed below in the context of a computing device, is used to determine users which are active at the computing device by, for example, controlling a camera to capture aspects of an environment around the device. An active-user queue for dynamically adjusting access permissions at the device according to, for example, a detected presence of one or more users near the particular computing device is established. Initially, when no user is considered active, the active-user queue can be established in response to a user entering a field of view of a camera of the computing device. Multiple image frames captured via the camera can be processed to determine whether an initial user is within the viewing window and/or whether any other users have entered the viewing window. The initial user can be considered active as long as they are exclusively detected in the viewing window. However, should the other user enter the viewing window, the other user can be assigned priority access to the device when one or more conditions are satisfied. By assigning access priorities in this way, access-restricted data, associated with particular users, can be protected from users that may access the computing device subsequent to the initial user leaving the field of view of the camera. In some implementations, this can ensure that systems, such as machinery or other safety-sensitive apparatuses, which are controllable using the access-restricted data rendered for a particular user of the device cannot be taken over and controlled by unauthorized users once the particular user is no longer active at, or otherwise controlling, the device. Furthermore, latency that is otherwise introduced via authentication procedures can be mitigated, thereby preserving computational resources that can be wasted during periods of latency. Yet further, in various implementations, personalized or otherwise access-restricted content for a given user can be prefetched (e.g., from a remote server) and/or pre-compiled (e.g., prepared for rendering on-device) responsive to the given user entering the user queue for the device, but before the given user has priority in the user queue for the device. In response to the given user subsequently having priority in the user queue for the device, the prefetched and/or precompiled personalized content or otherwise access-restricted data can be quickly rendered to the given user. This reduces the latency with which the personalized content or otherwise access-restricted data is rendered to the given user.

In some implementations, a first user and a second user can be present in a home (or other environment such as a manufacturing environment) that includes a computing device that provides access to an automated assistant. The first user can enter a vicinity of the computing device, for example by entering a room (such as a kitchen) that includes the computing device, in order to view access-restricted data accessible via an account of the first user. The access-restricted data may, for example, be associated with a particular automated apparatus in the environment. An example of the access-restricted data is a schedule that is accessible via an account of the first user, such as an editable schedule of operations to be performed by the automated apparatus. The automated apparatus in this context may be a safety or security-sensitive apparatus, such as a cleaning robot, a 3D printer, a smart appliance or, e.g., an automated manufacturing apparatus, to which access control may be restricted (e.g. restricted from access by minors or untrained persons). When the first user enters a field of view of a camera of the computing device, the computing device can process one or more image frames in order to verify that the first user has entered the field of view. When the first user has been verified by the computing device, an automated assistant can cause the computing device to render access-restricted content that is associated with an account of the first user. For example, prior to the first user entering the vicinity of the computing device, a display panel of the computing device can be rendering unrestricted content and/or non-personalized content, such as a non-editable version of the operations schedule for the automated apparatus that is accessible via the computing device, or e.g. publicly available images and/or other information. In response to the computing device verifying the presence of the first user within the field of view, the computing device can render at least some amount of content that is personalized to the user, such as access-restricted content. An example is the access-restricted editable schedule of operations for the automated apparatus and/or an editing interface for altering/amending the schedule. Optionally, and as described herein, the rendering of the content that is personalized to the user can be further responsive to determining one or more conditions are present that indicate the user is paying attention to the computing device (which may be a client device), such as determining, based on vision data from a vision component of the computing device, that a gaze of the user is directed to the computing device (e.g., for at least a threshold duration), that the user is within a threshold distance of the computing device, that a head pose and/or body pose of the user is directed to the computing device, and/or other condition(s) are present. In addition to, or as an alternative to, the access-restricted content referred to above, the computing device may also render other access-restricted content (e.g., a portion of a schedule of the user) and/or content that is publicly accessible, but determined to be of relevance to the user.

In some implementations, in response to verifying the presence of the first user, the automated assistant can cause queue data to be generated for assigning the priority to the first user at the device, as well as defining an amount of time that the user will be assigned priority at the device. The amount of time can be N minutes, seconds, and/or milliseconds, and/or any time value that can be assigned to a timer. As the timer is counting down, the amount of time for the first user to be assigned priority can eventually expire, which can result in no user having priority at the device, thereby causing the computing device to no longer render any access-restricted content. However, with prior permission from the first user and/or the second user, image data generated using the camera of the computing device can be processed to determine whether the first user remains present in the field of view of the camera. When the automated assistant determines that the first user is still in the field of view of the camera, the automated assistant can cause the timer to be reset (e.g., reset back to the initial amount of time "N"), in order to extend an amount of time that the user is assigned priority at the device.

While the first user is assigned the priority and the timer has not expired, the second user can enter the field of view of the camera by entering the vicinity of the device (e.g. the kitchen area). One or more image frames characterizing the second user can be processed in order to verify the presence of the second user, and, based on the verification, the second user can be assigned priority at the device over the first user. In some implementations, an indication of the change in priority can be indicated by the computing device using one or more graphical elements at the display interface, for example, avatars that are displayed over the top of each other, indicating that a particular user has priority over another user at the device. As changes in assignment of priority occur, the computing device can cease rendering personalized content associated with the first account of the first user, and, instead, render personalized content associated with a second account of the second user. For example, when the second user is assigned priority, the computing device can render access-restricted content for the second user. An example of such access-restricted content for the second user is content similar to that described above for the first user, which may allow the second user to control operational aspects of one or more automated apparatuses for which the second user is authorized. Additionally or alternatively, the computing device can render other graphical content, such as content characterizing one or more events identified on a stored calendar created by the second user.

In some implementations, the other timer for the second user can be initialized when the second user is verified and/or is assigned priority at the device over the first user. Furthermore, the other timer can be reset each time the second user is determined to be remaining in the field of view of the camera. However, when the second user is determined to no longer be in the field of view of the camera, the other timer can optionally be set to a reduced time (e.g., the other timer can have M minutes, seconds, and/or milliseconds deducted from the other timer, where "M" is any number value). When the other timer expires as a result of the second user not remaining in the field of view of the camera, the computing device can cease rendering access-restricted content associated with the second account of the second user. Accordingly, personalized content can be at least selectively rendered to corresponding users when they have priority in the user queue. Moreover, utilization of the countdown timer prevents prematurely assigning an alternative user as having priority in the user queue due to the current priority user only temporarily leaving a field of view of a vision component of the computing device and/or the current priority user only temporarily not being detected in image frames (despite being present in the field of view) due to turning his/her face, being occluded, and/or other condition(s). In these and other manners, personalized content for the alternative user is only rendered responsive to the countdown timer expiring for the current priority user and the alternative user becoming the new priority user. This prevents, for example, too frequent switching between rendering different personalized content, which can unnecessarily consume resources of the computing device and/or make rendered content more difficult to comprehend.

In some implementations, while the first user and the second user are determined to be within the field of view of the camera, a touch input can be provided to a touch display of the computing device. In order to determine how to respond to the touch input, the computing device can compare a distance, between the first user and the camera, to a proximity threshold. Furthermore, the computing device can also compare another distance, between the second user and the camera, to the proximity threshold. When the distance of the first user is determined to satisfy the proximity threshold, and the other distance of the second user is determined to also satisfy the proximity threshold, the automated assistant can respond to the touch input by providing further content that is based on the second account of the second user. This can be based on an assumption that the second user has acquiesced to the touch input because of their proximity to the camera. Alternatively, when the distance of the first user is determined to satisfy the proximity threshold, but the other distance of the second user is determined to not satisfy the proximity threshold, the automated assistant can respond by providing other content that is not based on the second account of the second user (e.g. by not rendering access-restricted content associated with the second account of the second user). This operation can be based on another assumption that the second user is not acquiescing to the touch input, because they are not located within a particular distance of the camera. Furthermore, when neither the first user or the second user are located at a particular distance that satisfies the proximity threshold, the automated assistant can assume that the touch input was provided by someone that is located outside the field of view of the camera. Therefore, in response to such a touch input, the automated assistant can respond by providing the other content that is not based on the second account of the user (and/or e.g. by providing content that is not based on the first account of the first user). When distance of a user is determined, various techniques can be utilized (e.g. at the computing device) to determine the distance. For example, the distance can be estimated based on distance between eyes of the user in image(s), a relative head size of the user in image(s), and/or other attribute(s) of the user in image(s).

In some implementations, priority at the computing device can change according to which user is determined to be paying attention to the computing device. For instance, when the first user is in the vicinity of the computing device (e.g. the kitchen area in which the device is located) without any other persons and is determined, by the computing device, to be viewing the computing device, the first user can be assigned priority at the computing device. Furthermore, a timer for the priority for the first user can also be initialized at this time. Thereafter, as long as the timer has not expired, the automated assistant can render access-restricted content associated with the first account of the first user. However, during this time, the first user may turn away from the computing device in order to attend to something else in the environment (e.g., turning off a stove). One or more images frames captured via the camera can be processed to determine that the first user has turned away, and, in response, an amount of time remaining on the timer can be reduced by M minutes, seconds, milliseconds, and/or any other time value, where "M" is any number value.

In some implementations, when the first user or the second user is assigned priority at the computing device and/or determined to be paying attention to the computing device, the automated assistant can cause "action items" to be rendered by the computing device. An action item can correspond to an action that the computing device, the automated assistant, and/or any other application is requesting the user to perform and/or respond to. For example, an action item can correspond to a software update that needs to be confirmed by a user before the software update is installed. Additionally, or alternatively, the action item can correspond to a notification that the automated assistant, the computing device, and/or any other application is requesting a user to acknowledge. For example, when the first user is assigned priority and also determined to be paying attention to the computing device and/or the automated assistant, the automated assistant can cause a message notification to be rendered at a touch display panel of the computing device. The message notification can operate as an "action item" because, by rendering the message notification, the automated assistant is requesting the first user to perform an "action" of acknowledging the message notification by, for example, tapping on an area of the touch display panel in which the message notification is being rendered. When the first user is determined to be no longer paying attention to the computing device and/or the "action item," the amount of time on the timer for the priority assigned to the first user can be reduced. Furthermore, in response to determining that the first user is no longer paying attention to the computing device and/or the action item, the automated assistant can cause the "action item" to no longer be rendered at the touch display of the computing device.

As used herein, "access-restricted content" of a given user is non publicly accessible content that is stored in computer memory in association with an account of the given user, and over which the user has access-control. In addition to those mentioned above, some non-limiting examples include content from a private calendar of the user, content from an email account of the user, and reminders from a private account of the user. In various implementations, the given user can provide permission to enable all or portions of (e.g., a snippet of or an abstraction of) access-restricted content to be at least selectively rendered via a shared computing device. For example, the given user can provide permission to enable rendering of at least portions of access-restricted content at a given client device generally, or only when the given user is recognized, by the given client device, using facial recognition and/or voice recognition. However, in some of those implementations access to additional portion(s) of the access-restricted content and/or the ability to edit the access-restricted content can only be provided in response to verifying that the given user is the one requesting access to the additional portion(s) and/or requesting the editing.

For example, voice recognition can be utilized to confirm that a spoken utterance, that requests access to the additional portion(s), is provided by the given user. Also, for example, facial recognition can be utilized to confirm that a touch-event at the client device (e.g., a touch selection of an abstraction of user-restricted content of the given user), that requests access to the additional portion(s) and/or the editing, is actually from the given user. For instance, as described herein, facial recognition and distance estimation can be utilized in combination to determine that the given user is within a threshold distance of the client device at a time of the touch event and optionally that any other user(s) are not within the threshold distance (or another threshold distance). As one particular example, the abstraction of the access-restricted content can be a graphical element that includes only "upcoming appointment tomorrow @ 12:00". If a touch-event directed to the graphical element is received, additional details of the appointment (e.g., a location of the appointment, a title for the appointment, etc.) will only be rendered in response if it is determined that the given user is within a threshold distance of the client device at a time of the touch event and optionally that any other user(s) are not within the threshold distance (or another threshold distance). In these and other manners, security of access-restricted content is maintained. Additionally, security is maintained while enabling rendering of aspects of the access-restricted content, with permission from the given user, under various conditions. Thus, utility of shared client devices can be improved by rendering aspects of access-restricted content from multiple accounts of the client devices (optionally at the same time), providing corresponding users with efficient overviews of the access-restricted content. Moreover, more detailed access to the access-restricted content can be enabled through touch-input (e.g., a single touch input) and utilization of facial recognition and user distance techniques disclosed herein. Such a single touch-input can be quicker to provide than a spoken utterance, thereby making the user-assistant interaction more efficient and decreasing the overall duration of the user-assistant interaction. Such a single touch-input is also effective in noisy conditions where speaker recognition can fail and/or also enables users with speech difficulties to effectively access access-restricted content.

As used herein, "personalized content" of a given user encompasses access-restricted content, but also encompasses content that is publicly accessible, but is rendered to a given user based on determining that the content is relevant to the given user. Public content can be determined to be relevant to a given user based on comparing attribute(s) of the content with attribute(s) of the given user, which can be based on historical interactions of the given user indicating interest in those attribute(s). For example, a given user may have previously viewed multiple articles related to Sports Team A and be provided with personalized content, that is a new publicly accessibly article, based on the new publicly accessible article being about Sports Team A. As with access-restricted content, in various implementations, the given user can provide permission to enable all or portions of personalized content (generally, or personalized content that is not also access-restricted content) to be at least selectively rendered via a shared computing device. For example, the given user can provide permission to enable rendering of at least portions of personalized content at a given client device generally, or only when the given user is recognized, by the given client device, using facial recognition and/or voice recognition.

The above description is provided as an overview of some implementations of the present disclosure. Further description of those implementations, and other implementations, are described in more detail below.

Other implementations may include a non-transitory computer readable storage medium storing instructions executable by one or more processors (e.g., central processing unit(s) (CPU(s)), graphics processing unit(s) (GPU(s)), and/or tensor processing unit(s) (TPU(s)) to perform a method such as one or more of the methods described above and/or elsewhere herein. Yet other implementations may include a system of one or more computers that include one or more processors operable to execute stored instructions to perform a method such as one or more of the methods described above and/or elsewhere herein.

It should be appreciated that all combinations of the foregoing concepts and additional concepts described in greater detail herein are contemplated as being part of the subject matter disclosed herein. For example, all combinations of claimed subject matter appearing at the end of this disclosure are contemplated as being part of the subject matter disclosed herein.

DETAILED DESCRIPTION

Figure 1A:
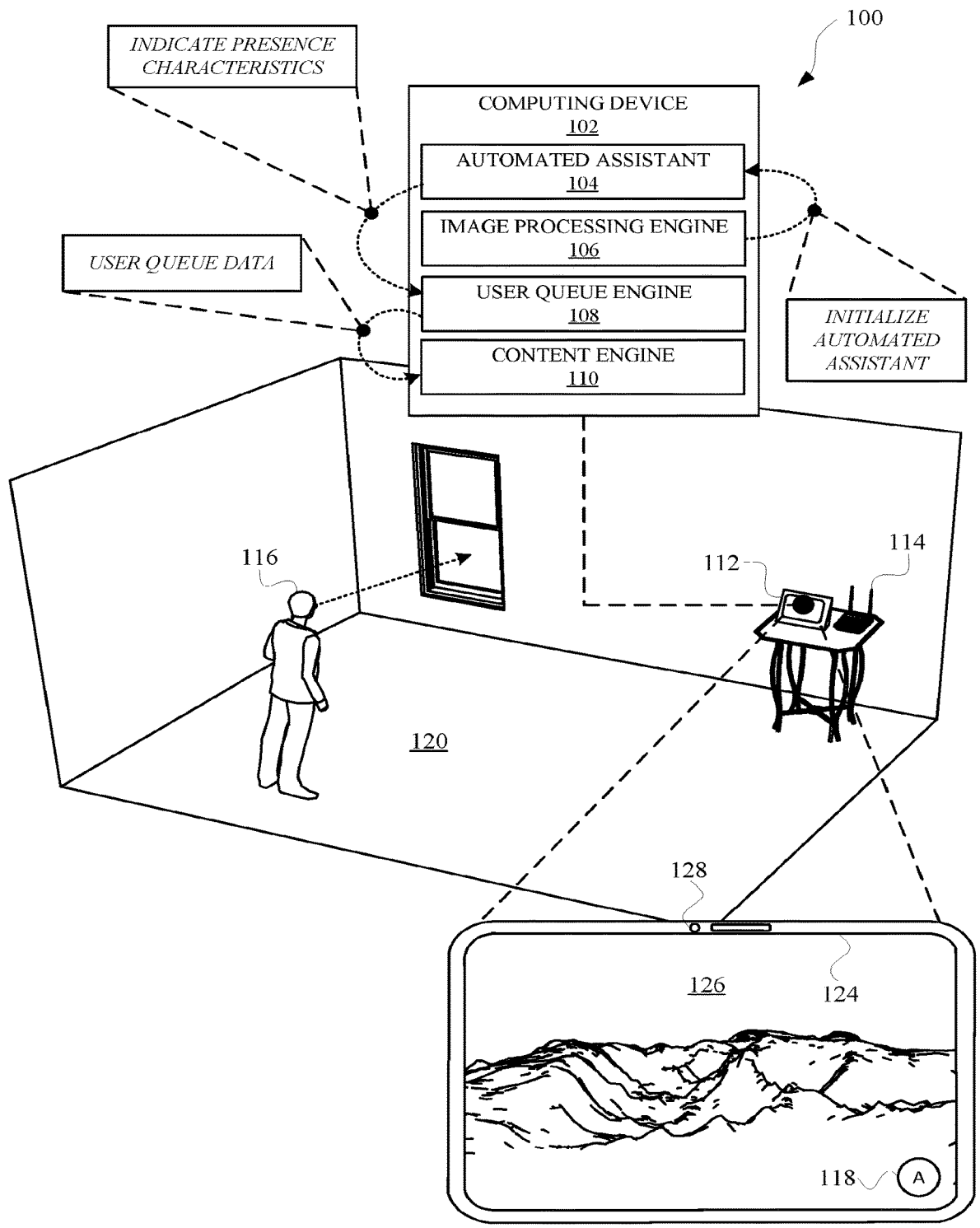
FIG. 1A, FIG. 1B, FIG. 1C, and FIG. 1D illustrate views of a user queue that is provided to indicate an access priority of one or more users that have access to a computing device.

FIG. 1A-1D illustrate a view 100, a view 130, a view 140, and a view 150, respectively, of a user queue that is provided to indicate an access priority of one or more users that have access to a computing device 102. Specifically, FIG. 1A illustrates a view 100 a computing device 102 indicating a priority of the user 116 based on one or more features of a circumstance in which the user 116 is present with the computing device 102. For example, the user 116 can enter an area 120 that includes the computing device 102, which can provide access to an automated assistant 104. The computing device 102 can be an assistant-enabled device 112 that includes a display panel 124 and one or more cameras, which can be activated or deactivated by the user 116. The camera 128 can capture one or more images of the user 116, with prior permission from the user, and the one or more images can be processed by an image processing engine 106 of the computing device 102. The image processing engine 106 can process the one or more images to identify the user 116 that is present, determine an orientation of the user 116, and/or determine whether the user 116 facing or otherwise paying attention to the computing device 102.

Data generated by the image processing engine 106 can be provided to the automated assistant 104 in order to initialize the automated assistant 104. In response to receiving the data from the image processing engine 106, the automated assistant 104 can cause the data to be processed in order to determine various attributes characterizing the user 116. For example, the data can be processed in order to determine whether the user 116 is within a field of view of the camera 128, is facing the display panel 124, is facing the camera 128, and/or is within a particular threshold distance of the computing device 102 and/or the display panel 124.

Characteristics of the presence of the user 116 can be communicated to the user queue engine 108, in order that the user queue engine 108 can initialize and/or modify a user queue based on the characteristics of the presence of the user 116. For example, based on the data from the image processing engine 106, the automated assistant 104 can determine that the user is present within the field of view of the camera 128, but is not facing the camera and/or is otherwise not directing their attention at the camera 128. The automated assistant 104 can communicate these characteristics to the user queue engine 108, which can establish a user queue. The user queue can identify the user 116 as having priority with respect to: content that can be provided by the computing device 102, and/or access privileges to the computing device 102.

The user queue engine 108 can provide the user queue data to a content engine 110 of the computing device 102. The content engine 110 can process the user queue data in order to generate content data for rendering at the display panel 124. In some implementations, the content engine 110 can cause the display panel 124 to render a first graphical element 118, which can symbolize a position of the user 116 in the user queue. In some implementations, the first graphical element 118 can include an avatar of the user 116, in order to put the user 116 on notice of their position within the user queue. Furthermore, the content engine 110 can cause the display panel 124 to render a graphical user interface 126 that includes personalized content that is associated with the user 116. For example, graphical user interface 126 can include a picture that: the user 116 has recently viewed and/or is associated with an account for another device that the user 116 has accessed.

Figure 1B:
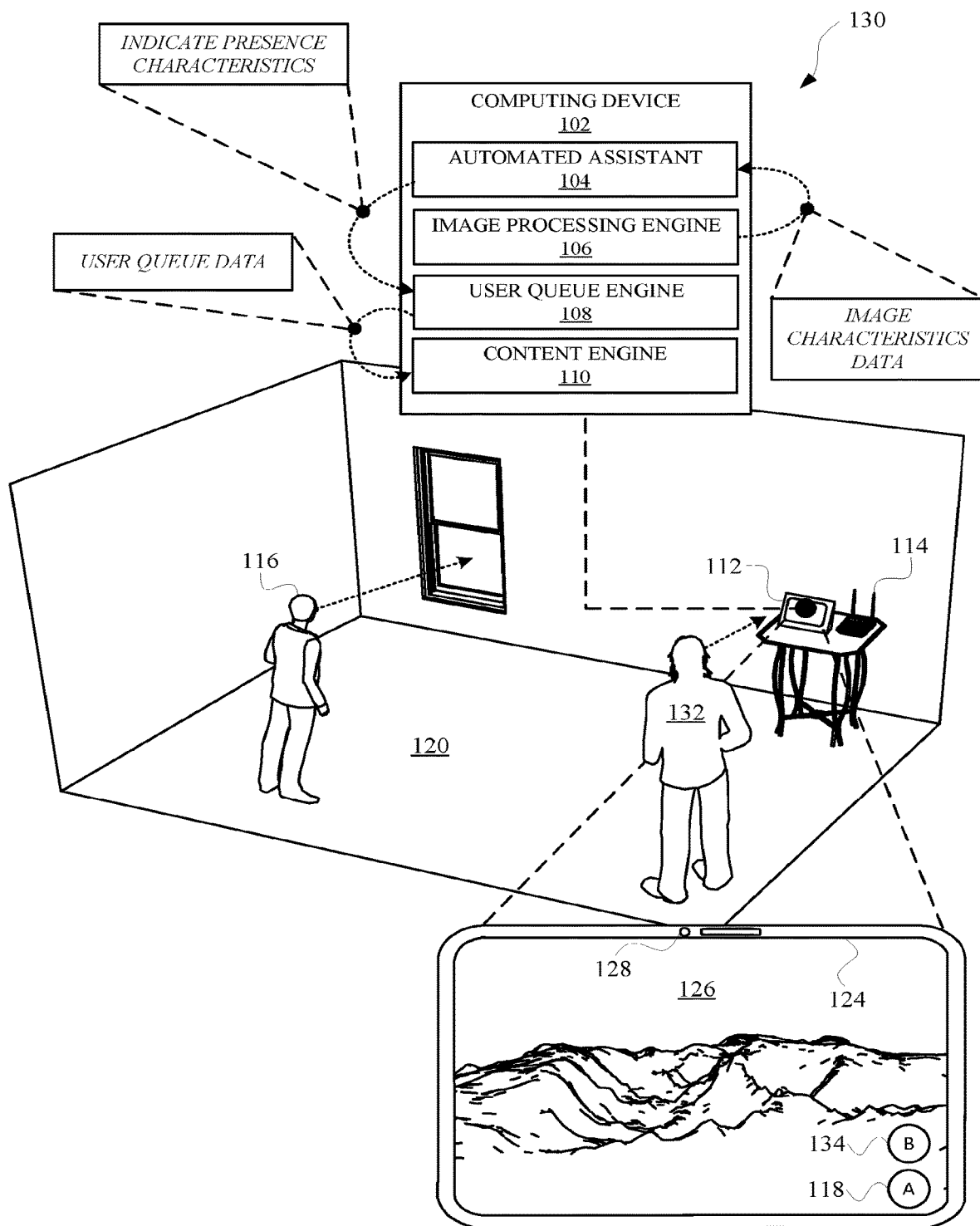

FIG. 1B illustrates a view 130 of another user 132 entering the area 120 in which the user 116 was acknowledged by the computing device 102. In response to the other user 132 entering the area 120, the image processing engine 106 can process one or more images captured by the camera 128. Based on processing the images, the image processing engine 106 can generate additional data characterizing characteristics a presence of the other user 132. For example, the image processing engine 106 can process the images to determine that the user 132 is within the field of view of the camera 128, and/or that the other user 132 is a different registered user from the user 116.

In some implementations, the image processing engine 106 can verify that the other user 132 is registered with the automated assistant 104 and/or the computing device 102. When the image processing engine 106 verifies that the other user 132 is registered with the automated assistant 104 and/or the computing device 102, the image processing engine 106 can communicate additional data to the automated assistant 104. The automated assistant 104 can process the additional data to identify characteristics of the presence of the other user 132 in the area 120. For example, the automated assistant 104 can determine that the other user 132 is within the field of view of the camera 128 and is facing the computing device 102. Furthermore, the automated assistant 104 can process the additional data to determine that the user 116 is now looking out of the window that is adjacent to the computing device 102.

The automated assistant the 104 can communicate characteristic data to the user queue engine 108, which can generate and/or modify user queue data that assigns another priority to the other user 132. The user queue data can identify the other user 132 as having priority over the user 116, at least based on the other user 132 paying attention to the computing device 102 (e.g., looking at the display panel 124), despite the user 116 entering the field of view of the camera 128 before the other user 132 entered the field of view of the camera 128.

The user queue engine 108 can provide the user queue data to the content engine 110, which can cause the display panel 124 to render content characterizing the positions of the user 116 and the other user 132 within the user queue. For example, the content engine 110 can cause the display panel 124 to render the first graphical element 118 below a second graphical element 134. The second graphical element 134 can symbolize the other user 132 and can indicate the priority of the other user 132 over the user 116, at least based on the second graphical element 134 being located above the first graphical element 118.

Figure 1C:
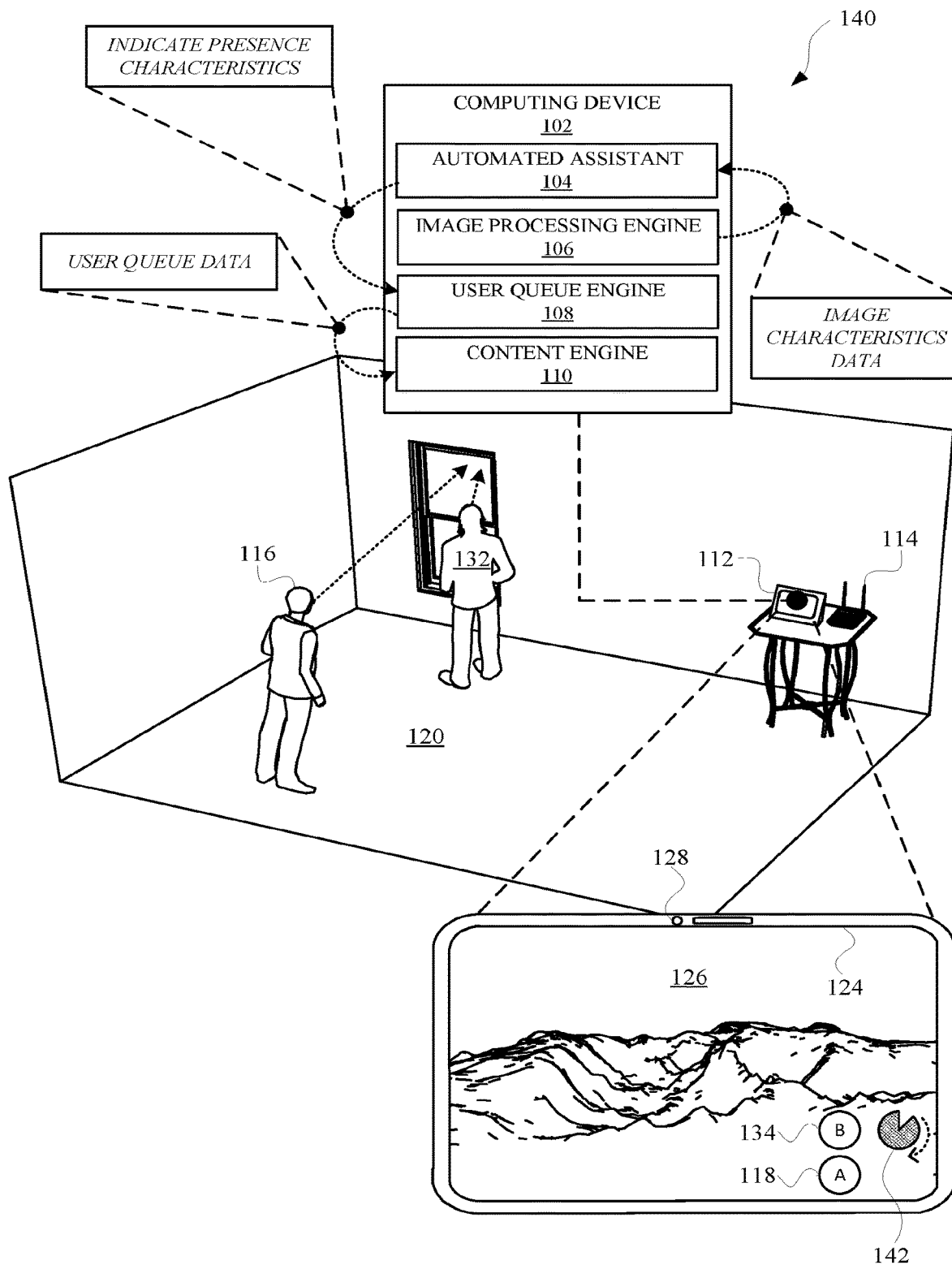

FIG. 1C illustrates a view 140 of the other user 132 causing a timer 142 to be initialized in response to the other user 132 moving out of the field of view of the camera 128 and/or no longer paying attention to the computing device 102. The timer 142 can be characterized by the user queue data, which can define an amount of time that the other user 132 will be assigned their particular position in the user queue. The user queue data can establish the timer 142 in response to detecting the other user 132 is within the field of view of the camera 128, but not initialize the timer 142 until the other user 132 is out of the field of view of the camera 128. Alternatively, or additionally, the user queue data can establish the timer in response to the other user 132 facing the display panel 124 for at least a threshold period of time (e.g., an amount of time satisfying a gaze threshold corresponding to any time value such as, but not limited to, 2 seconds), but not initialize the timer until the other user 132 is no longer facing the display panel 124, and/or no longer within the field of view of the camera 128. For example, as illustrated in view 140 of FIG. 1C, in response to the other user 132 moving out of the field of view of the camera 128 and/or facing the window that is adjacent to the computing device 102, the timer 142 can initialize a real-time countdown. The countdown can be illustrated by the clockwise direction arrow, which shows how the circular timer 142 is transitioning from a full circle, to a partial circle with a percentage of missing area that is gradually increasing.

Figure 1D:
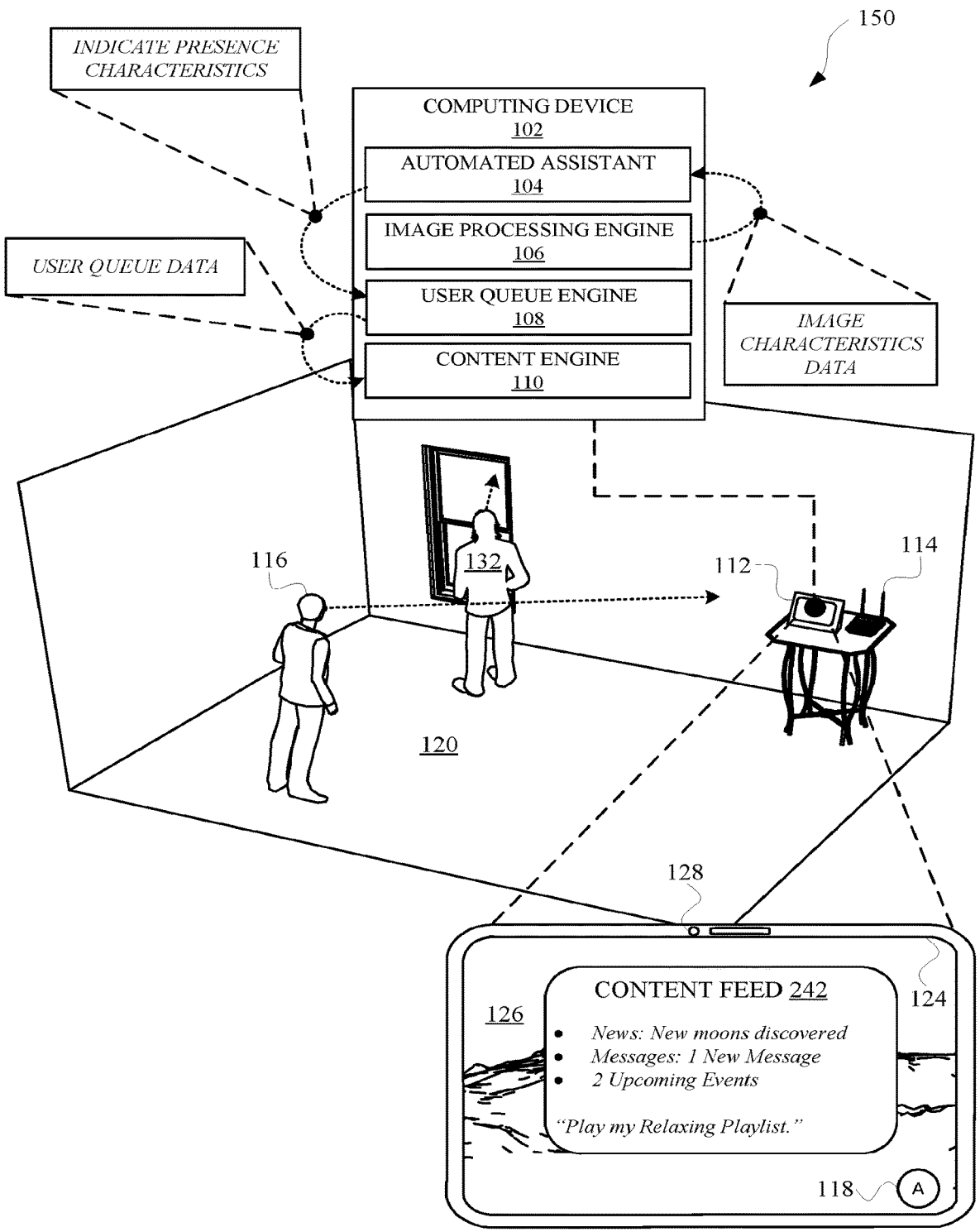

When the timer 142 eventually expires after the set amount of time, the other user 132 can be removed from the user queue. Furthermore, in some implementations, when the timer 142 eventually expires, the first graphical element 118 can be rendered above the second graphical element 134, thereby indicating that the user 116 has priority over the other user 132. For example, FIG. 1D illustrates a view 150 of the user 132 relocating outside of the field of view of the camera 128 and/or no longer facing the display panel 124. In order to determine that the other user 132 has relocated outside of the field of view of the camera 128 and/or is no longer facing the display panel 124, the image processing engine 106 can process one or more images. The images can characterize the user 116 as being within the field of you of the camera 128, and the other user 132 as no longer being within the field of view of the camera 128.

The image processing engine 106 can generate data characterizing one or more users that are located within the field of view of the camera 128 and provide the generated data to the automated assistant 104. The automated assistant 104 can process the generated data to determine characteristics of the presence of the one or more users within the field of view of the camera 128. For example, the automated assistant 104 can determine whether the user 116 is facing the display panel 124 and/or whether the other user 132 is facing the display panel 124.

Such characteristic data generated by the automated assistant 104 can be provided to a user queue engine 108, which can generate and/or modify a user queue based on the characteristic data from the automated assistant 104. For instance, because the user 116 is facing the display panel 124 and the other user 132 is no longer within the field of view of the camera 128, the user queue data can be provided to indicate that the user 116 is the only user in the user queue. In some implementations, the other user 132 can be removed from the user queue based on the timer 142 expiring or otherwise gradually decreasing to a zero value, or other value indicating that the timer 142 has expired in real-time. In some implementations, when the other user 132 is determined to be located outside the field of view of the camera 128 after viewing the display panel 124, the automated assistant 104 can cause the timer 142 to be deducted a particular value of time. In some implementations, this deducted value of time can be selected based on whether there is one or more other users within the field of view of the camera 128. When there are no other users present in the field of view, the amount deducted can be less than another amount that would be deducted if there was one or more users present in the field of view of the camera 128 when the other user 132 was viewing the display panel 124.

Figure 2A:
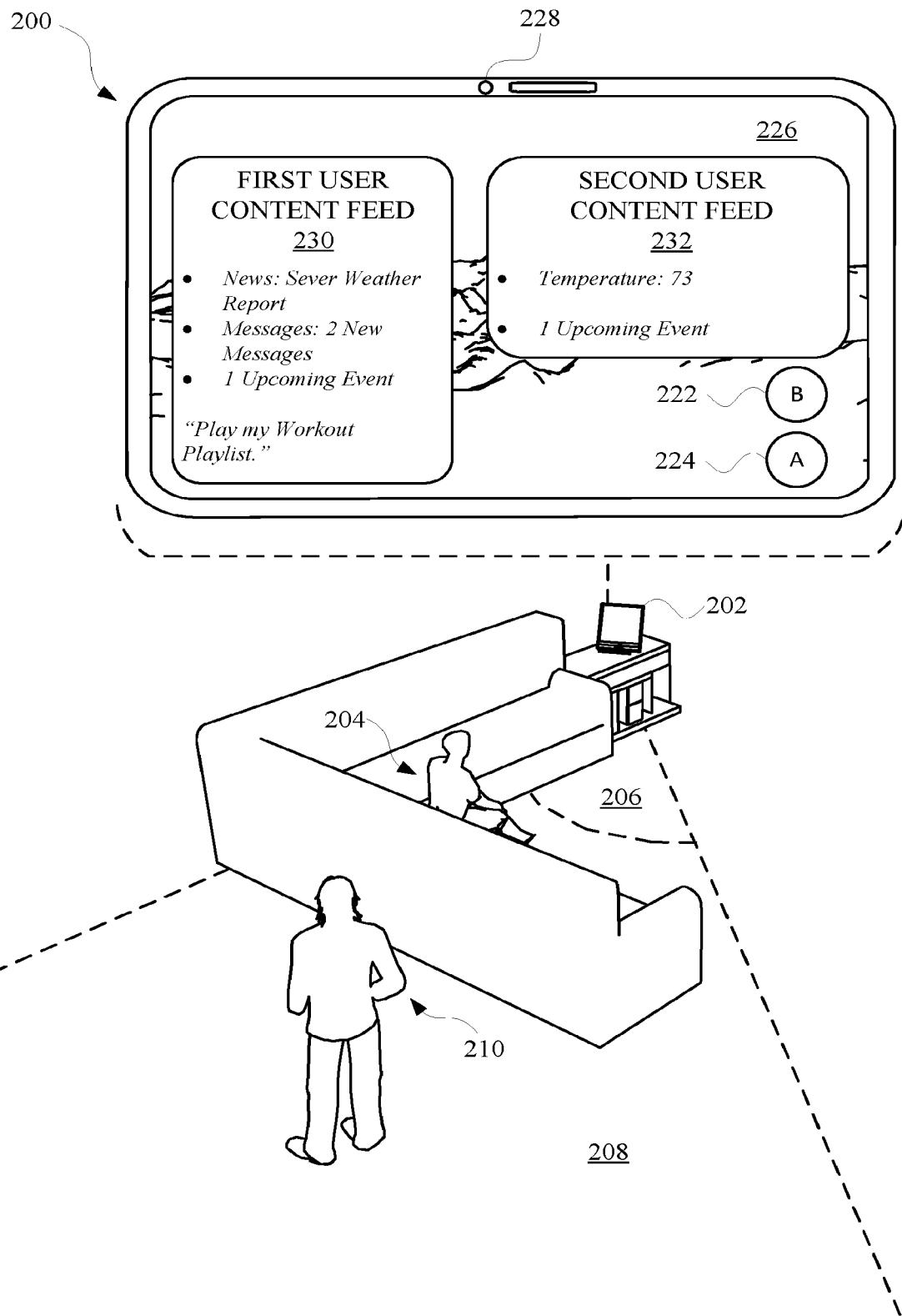
FIG. 2A, FIG. 2B, and FIG. 2C illustrate views of a computing device that is responsive to user inputs according to a distance of the user, verification of the user, and/or whether the user has priority in a user queue managed by an automated assistant application.
Figure 2B:
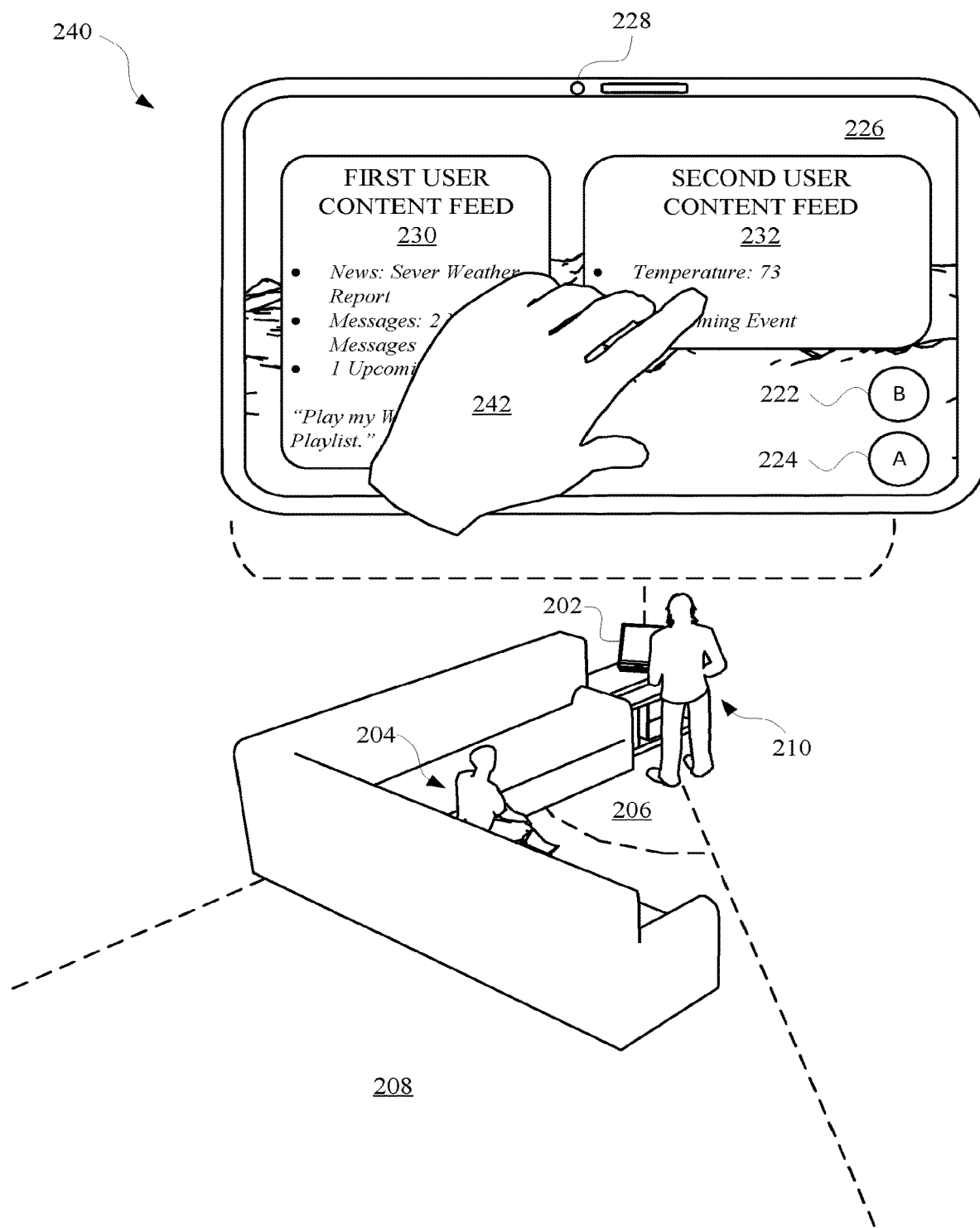
Figure 2C:
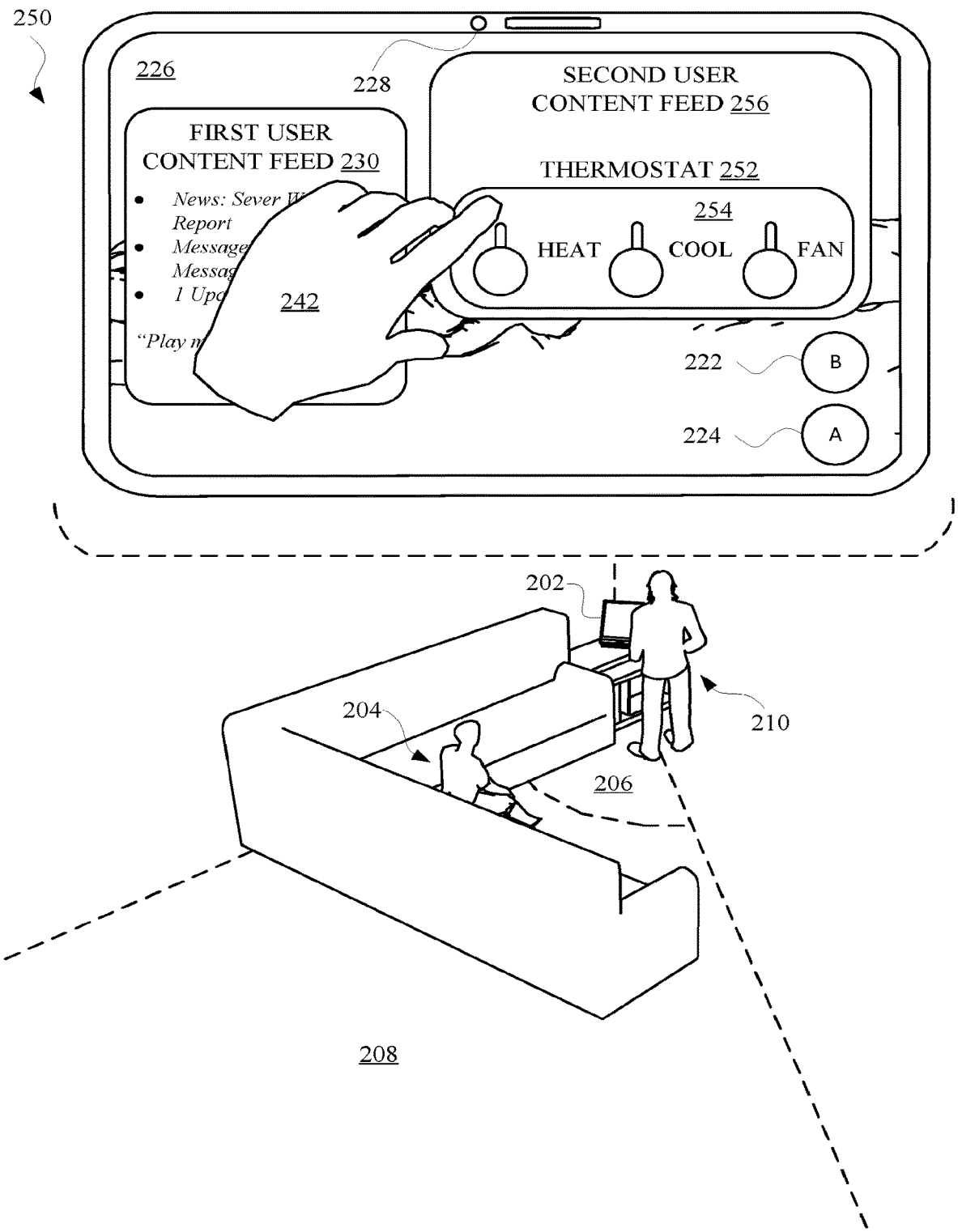

FIG. 2A, FIG. 2B, and FIG. 2C illustrate a view 200, a view 230, and a view 240, respectively, of a computing device 202 that is responsive to user inputs according to a distance of the user, verification of the user, and/or whether the user has priority in a user queue managed by an automated assistant. In some implementations, the computing device 202 can process one or more images indicating that a first user 204 and a second user 210 are located within a field of view 208 of a camera 228 of the computing device. In response to determining that the first user 204 and the second user 210 are within the field of view 208, the computing device 202 can generate user queue data characterizing a position of each user within a user queue. For example, the first user 204 could have been present in the field of view of the camera 228 before the second user 210. However, when the second user 210 enters the field of view of the camera 228, the computing device 202 can determine that the second user 210 is looking at a graphical user interface 226 of the computing device 202. In response, the computing device 202 can generate user queue data that identifies the second user 210 as having priority over the first user 204.

The priority can refer to an order or hierarchy of users that the computing device 202 will generate content for, respond to inputs from, and/or otherwise interact with. In some implementations, an automated assistant accessible via the computing device 202 can limit the users that are identified in the user queue to those users that have an account that is accessible via the automated assistant, that have registered with the automated assistant, and/or that have otherwise provided prior permission to the user to identify and/or prioritize those users.

In some implementations, the computing device 202 can process the user queue data and cause a first graphical element 224 and a second graphical element 222 to be rendered at the graphical user interface 226. An arrangement of the graphical elements can indicate a priority of the users in the user queue. For example, although the second user 210 entered the field of view 208 of the camera 228 after the first user 204, the second user 210 was determined to have looked at the graphical user interface 226 before the first user 204. Therefore, because of this order of actions, the second graphical element 222 corresponding to the second user 210 can be rendered above the first graphical element 224 corresponding to the first user 204, because the second user 210 has been assigned priority "over" the first user 204.

The second user 210 can subsequently approach the computing device 202, as illustrated in view 230 of FIG. 2B, and provide an input to the computing device 202. For example, the second user 210 can use their hand 232 to provide a touch input to a location on the graphical user interface 226. The computing device 202 can process one or more images prior to, during, and/or after the second user has provided the touch input. The one or more images can be processed to determine a distance of the second user 210 relative to the computing device 202. For example, the computing device 202 can determine whether the second user 210 is within a threshold distance 206 of the computing device 202 for providing a touch input to the computing device 202. When the computing device 202 determines that the second user 210 is within the threshold distance 206, the computing device 202 can provide a personalized response that includes content associated with the second user 210. However, when neither the first user 204 or the second user 210 are determined to be within the threshold distance 206, the computing device 202 can determine that the touch input could not have come from the first user 204 or the second user 210. Therefore, in response to receiving the touch input when the first user 204 and the second user 210 are determined to not be within the threshold distance 206, the computing device 202 can correlate the touch input to an input from a guest. In response to receiving the guest touch input, a computing device 202 can provide content that is not personalized for the first user 204 or the second user 210.

In some implementations, because the second user 210 is considered to have priority over the first user 204 with respect to the user queue, and the second user 210 is within the threshold distance 206 when providing the touch input, the response to the touch input can be based on previous interactions between the second user 210 and: the computing device 202, an automated assistant, and/or any other application or device accessible to the second user 210.

For example, as provided in view 240 of FIG. 2C, in response to the touch input from the second user 210, the computing device 202 can cause a thermostat application 242 to render a control interface 244 with which the second user 210 can control the thermostat application 242. The thermostat application 242 can be selected for rendering at the graphical user interface 226 based on one or more previous instances when the second user 210 accessed the thermostat application 242 around the same time as the second user 210 provided the touch input at FIG. 2B. For example, the second user 210 can be coming home from work, and the second user 210 can have a history (e.g., as indicated by historical interaction data accessible to the automated assistant) of coming home from work and engaging the automated assistant to control the thermostat application 242. Therefore, in response to the second user 210 having a priority over the first user 204 and being within the threshold distance 206, the computing device 202 can access historical interaction data characterizing these previous engagements by the second user 210. The historical interaction data can be used to generate content to render at the graphical user interface 226 in anticipation of the second user 210 providing an input to the computing device 202. By generating content in this anticipatory way, latency between a user providing an input to the computing device 202 and the computing device 202 providing a suitable response can be mitigated. By mitigating such latency, computational resources such as processing bandwidth and power can be preserved, thereby extending an operational lifetime of the computing device 202.

In some implementations, when the first user 204 and the second user 210 are located within the field of view of the camera 228 but not within the threshold distance 206 of the graphical user interface 226, the graphical user interface 226 can be rendering first content for the first user 204 and second content for the second user 210. For instance, the first content can be rendered at the left side of the graphical user interface 226 and the second content can be rendered at the right side of the graphical user interface 226. When the second user 210 moves into the threshold distance (i.e., Proximity threshold), and the computing device 202 can determine that the second user 210 is the user that relocated to within the threshold distance 206. This determination can be based on processing a set of one or more images captured by the camera 228. In some implementations, when the second user 210 taps the computing device 202 at a location corresponding to the second content (e.g., at the right side of the of the graphical user interface), the tap input can be processed in furtherance of providing access and/or modifying the second content. However, when the second user 210 taps the computing device 202 at a location corresponding to the first content (e.g., at the left side of the graphical user interface), the computing device 202 can process the tap input in order that the tap input does not affect the first content, because the first user 204 is not within the threshold distance 206.

However, in some implementations, when the first content and the second content are being rendered simultaneously at the graphical user interface 226, and both the first user 204 and the second user 210 are determined, by the computing device 202, to be within the threshold distance 206, a touch input from the second user 210 at the first content (e.g., personalized content for the first user 204) can be processed in furtherance of providing access and/or modifying the first content. Such touch inputs can affect the first content under such contexts because the proximity of the first user 204 and the second user 210 can be considered, with prior permission from the first user 204, to be giving permission for the second user 210 to access the personalized content for the first user. In some implementations, the computing device 202 can determine that the first user 204 is giving permission for the second user 210 to access the first content when both the first user 204 and the second user 210 are located within the threshold distance 206, and both the first user 204 and the second user 210 are determined to be facing the graphical user interface 226. In other implementations, the computing device 202 can determine that the first user 204 is giving permission for the second user 210 to access the first content when both the first user 204 and the second user 210 are determined to be facing the graphical user interface 226, and the second user 210 is within the threshold distance 206 of the computing device 202. This process of interpreting permissions can mitigate latency and wasting of computational resources that would otherwise be exhibited by the computing device 202 if the first user 204 was required to provide an authenticating input (e.g., a voice input) that would delay the accessing of the first content by the second user 210.

Figure 3:
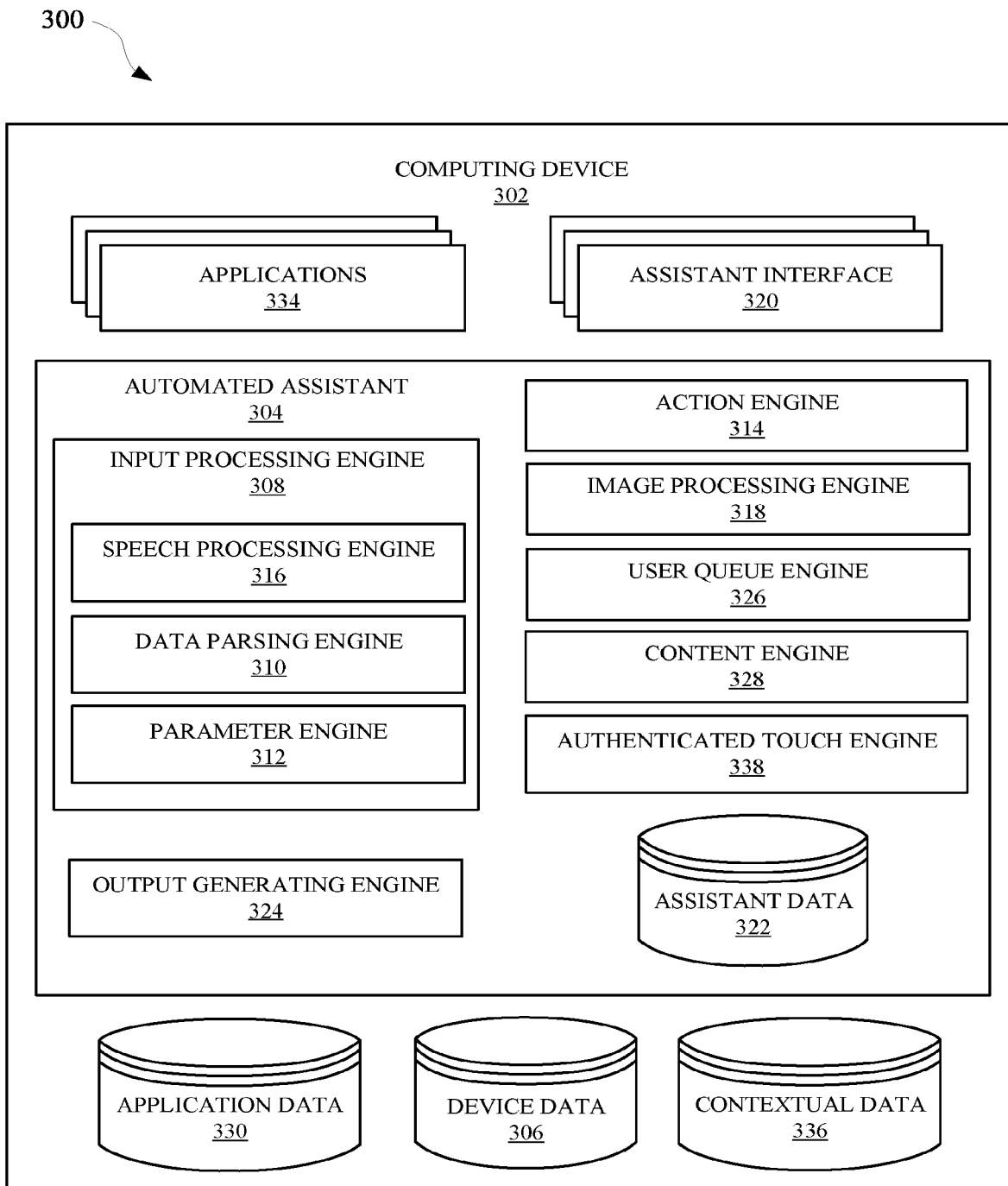
FIG. 3 illustrates a system for providing an automated assistant that manages a user queue for dynamically adjusting access permissions according to, for example, a detected presence and/or authentication of one or more users near a particular computing device.

FIG. 3 illustrates a system 300 for providing an automated assistant that manages an active-user queue for dynamically adjusting access permissions according to, for example, a detected presence and/or authentication of one or more users near a particular computing device. The automated assistant 304 can operate as part of an assistant application that is provided at one or more computing devices, such as a computing device 302 and/or a server device. A user can interact with the automated assistant 304 via an assistant interface 320, which can be a microphone, a camera, a touch screen display, a user interface, and/or any other apparatus capable of providing an interface between a user and an application. For instance, a user can initialize the automated assistant 304 by providing a verbal, textual, and/or a graphical input to an assistant interface 320 to cause the automated assistant 304 to perform a function (e.g., provide data, control a peripheral device, access an agent, generate an input and/or an output, etc.). The computing device 302 can include a display device, which can be a display panel that includes a touch interface for receiving touch inputs and/or gestures for allowing a user to control applications 334 of the computing device 302 via the touch interface. In some implementations, the computing device 302 can lack a display device, thereby providing an audible user interface output, without providing a graphical user interface output. Furthermore, the computing device 302 can provide a user interface, such as a microphone, for receiving spoken natural language inputs from a user. In some implementations, the computing device 302 can include a touch interface and can be void of a camera (or include a camera), but can optionally include one or more other sensors.

The computing device 302 and/or other third party client devices can be in communication with a server device over a network, such as the internet. Additionally, the computing device 302 and any other computing devices can be in communication with each other over a local area network (LAN), such as a Wi-Fi network. The computing device 302 can offload computational tasks to the server device in order to conserve computational resources at the computing device 302. For instance, the server device can host the automated assistant 304, and/or the computing device 302 can transmit inputs received at one or more assistant interfaces 320 to the server device. However, in some implementations, the automated assistant 304 can be hosted at the computing device 302, and various processes that can be associated with automated assistant operations can be performed at the computing device 302.

In various implementations, all or less than all aspects of the automated assistant 304 can be implemented on the computing device 302. In some of those implementations, aspects of the automated assistant 304 are implemented via the computing device 302 and can interface with a server device, which can implement other aspects of the automated assistant 304. The server device can optionally serve a plurality of users and their associated assistant applications via multiple threads. In implementations where all or less than all aspects of the automated assistant 304 are implemented via computing device 302, the automated assistant 304 can be an application that is separate from an operating system of the computing device 302 (e.g., installed "on top" of the operating system)—or can alternatively be implemented directly by the operating system of the computing device 302 (e.g., considered an application of, but integral with, the operating system).

In some implementations, the automated assistant 304 can include an input processing engine 308, which can employ multiple different modules and/or engines for processing inputs and/or outputs for the computing device 302 and/or a server device. For instance, the input processing engine 308 can include a speech processing engine 316, which can process audio data received at an assistant interface 320 to identify the text embodied in the audio data. The audio data can be transmitted from, for example, the computing device 302 to the server device in order to preserve computational resources at the computing device 302. Additionally, or alternatively, the audio data can be processed at the computing device 302.

The process for converting the audio data to text can include a speech recognition algorithm, which can employ neural networks, and/or statistical models for identifying groups of audio data corresponding to words or phrases. The text converted from the audio data can be parsed by a data parsing engine 310 and made available to the automated assistant 304 as textual data that can be used to generate and/or identify command phrase(s), intent(s), action(s), slot value(s), and/or any other content specified by the user. In some implementations, output data provided by the data parsing engine 310 can be provided to a parameter engine 312 to determine whether the user provided an input that corresponds to a particular intent, action, and/or routine capable of being performed by the automated assistant 304 and/or an application or agent that is capable of being accessed via the automated assistant 304. For example, assistant data 322 can be stored at the server device and/or the computing device 302, and can include data that defines one or more actions capable of being performed by the automated assistant 304, as well as parameters necessary to perform the actions. The assistant data 322 generated via the input processing engine 308 can be processed by an output generating engine 324, in order to cause the automated assistant 304 to provide an output to the user via an assistant interface 320, and/or initialize one or more actions associated with one or more applications 334.

In some implementations, the computing device 302 can include one or more applications 334, which can be provided by a third-party entity that is different from an entity that provided the computing device 302 and/or the automated assistant 304. An action engine 314 of the automated assistant 304 and/or the computing device 302 can access application data 330 to determine one or more actions capable of being performed by one or more applications 334. Furthermore, the application data 330 and/or any other data (e.g., device data 306) can be accessed by the automated assistant 304 to generate contextual data 336, which can characterize a context in which a particular application 334 is executing at the computing device 302, and/or a context in which a particular user is accessing the automated assistant 304 and/or the computing device 302.

In some implementations, the automated assistant 304 and/or the computing device 302 can include an image processing engine 318 for processing images captured by one or more cameras of the computing device 302. The image processing engine 318 can process the images can determine whether one or more persons are within a field of view of the camera, whether the one or more persons are users that are registered with the computing device 302 and/or the automated assistant 304, whether one or more users are facing a display interface of the computing device 302, and/or any other information that can be determined from processing images.

The image processing engine 318 can communicate information to the input processing engine 308, in order that the automated assistant 304 can be responsive to a particular user affecting images that are captured by the camera. For example, in response to determining that a user has entered a field of view of the camera, the automated assistant 304 can query a user queue engine 326 to determine whether the user is assigned a position in a user queue. When the user is assigned a priority position in the user queue, the automated assistant 304 can cause a content engine 328 to generate content for rendering at the display interface of the computing device 302. For example, the content engine 328 can access the application data 330, assistant data 322, device data 306, contextual data 336, and/or any other data that can be used to generate personalized content for the user. However, when the automated assistant 304 determines that the user is not assigned a priority position in the user queue, the automated assistant 304 can cause the user queue engine 326 to generate and/or modify user queue data to indicate that the user is assigned a position within the user queue. In some implementations, the automated assistant 304 can cause the content engine 328 to generate personalized content in anticipation of the user eventually being assigned the priority position in the user queue.

In some implementations, when the user queue engine 326 indicates that the user is not assigned a position in the user queue, the automated assistant 304 can cause the user queue engine 326 to generate and/or modify user queue data to assign the user a position, and also define parameters for a timer that is designated for the user. In other words, when the user enters the field of view of the camera, a timer can be established for designating an amount of time that the user will have their respective position in the user queue. The timer can then be initialized in response to the user leaving the field of view of the camera. In some implementations, the amount of time assigned to the camera can be reduced (e.g., reduced by a time value "R," where R is any number) when another person is in the user queue when the user leaves the field of view, and the timer can also then be initialized. In this way, the amount of time that the other user will be assigned the priority position can be reduced, in view of the initial user leaving the field of view of the camera.

In some implementations, when the automated assistant 304 determines that the user is facing the display interface of the computing device 302, an amount of time assigned to the timer for the respective user can be reset and/or increased, in order to extend an amount of time for their respective timer. In response to the user subsequently turning away from display interface, the timer can be initialized, thereby causing the time to gradually decrease toward a zero value, or another expiration value. In this way, when multiple users are in a field of view of the camera, one user will not maintain a priority over all others based on their presence, but rather based on whether the user has paid attention to the display interface and then looked away. This can allow other users, who have an interest in interacting with the computing device 302, to be assigned priority after a previous user has inferred that they are no longer interested in the computing device 302, at least for the moment.

In some implementations, the computing device 302 can include an authenticated touch engine 338, which can process various information available to the computing device 302 in order to determine whether an input was from a particular user. For instance, the image processing engine 318 can determine whether a particular user is located within a proximity threshold, and provide information to the authenticated touch engine 338 based on this determination. The authenticated touch engine 338 can then have this information prior to, and/or when, a user providing an input to, for example, a touch interface of the computing device 302. When the user is identified by the automated assistant 304 and determined to be located at a distance that satisfies the proximity threshold, the authenticated touch engine 338 can determine that an input to the touch interface is from the user. The authenticated touch engine 338 can then communicate with the content engine 328 in order to cause the content engine 328 to generate content that is personalized for the user. However, when person is not identified but nonetheless determined to be located at a distance that satisfies the proximity threshold, the authenticated touch engine 338 can communicate with the content engine 328 in order to cause the content engine 328 to provide content that is suitable for a guest user and/or not personalized for any registered user.

In some implementations, when multiple users are located at a distance that satisfies the proximity threshold, the authenticated touch engine 338 and/or the content engine 328 can operate based at least on user queue data. For example, when a first user is assigned priority over a second user in the user queue, but both the first user and the second user satisfy the proximity threshold, any touch input can be designated by the authenticated touch engine 338 as being from the user. Additionally, or alternatively, when the first user is assigned priority over the second user in the user queue, and both the first user and the second user satisfy the proximity threshold, the content engine 328 can cause a display interface of the computing device 302 to render content that is tailored for the first user.

Figure 4A:
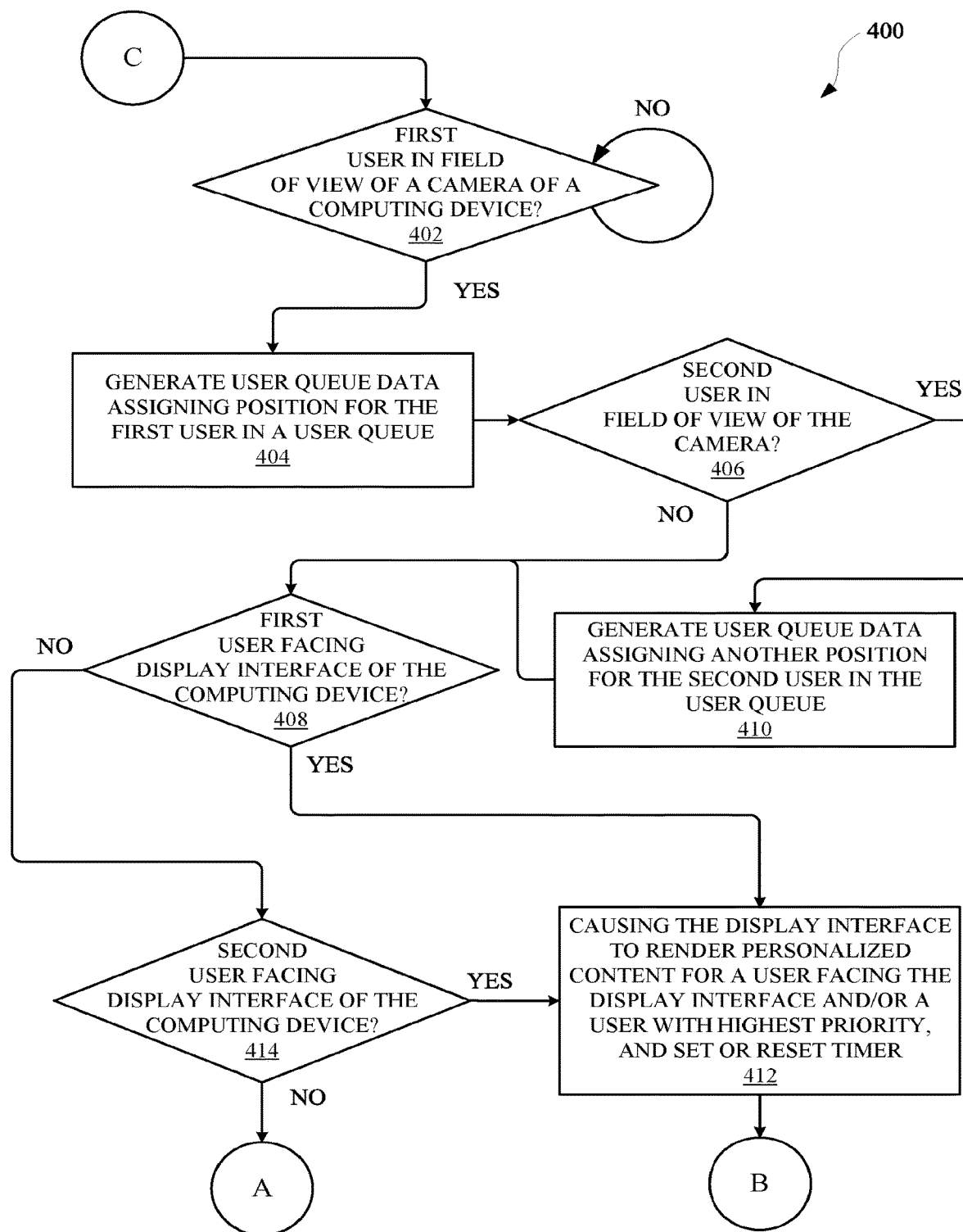
FIG. 4A and FIG. 4B illustrate methods for managing a user queue in order to render personalized content and/or identify a user to be responsive to, in certain circumstances.
Figure 4B:
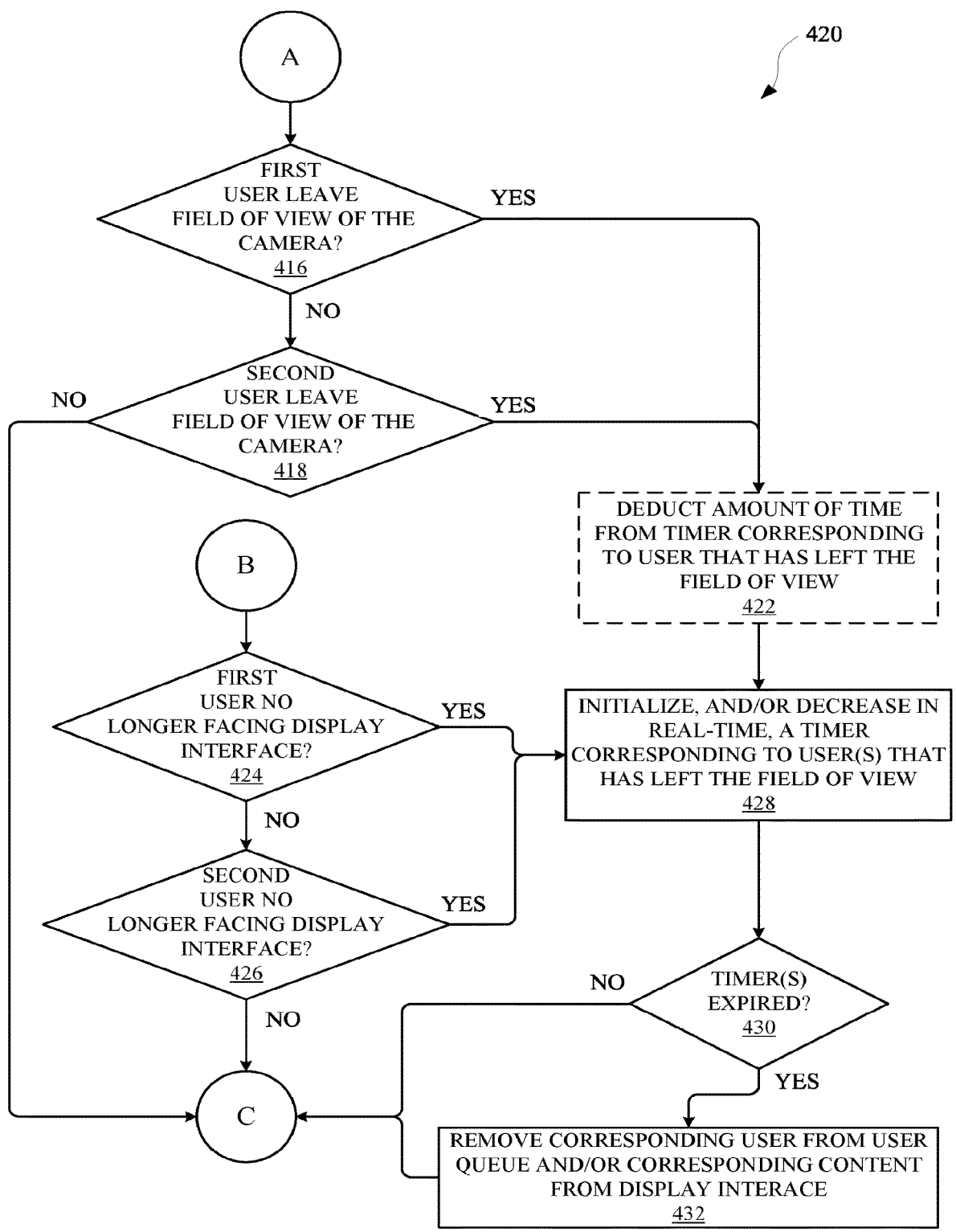

FIG. 4A and FIG. 4B illustrate method 400 and method 420 for managing a user queue in order to render personalized content and/or identify a user to be responsive to in certain circumstances. The method 400 can be performed by one or more computing devices, applications, and/or any other apparatus or module that can be associated with an automated assistant. The method 400 can include an operation 402 of determining whether a first user has entered a field of view of a camera of a computing device. Field of view of the camera can be any location in which a portion of a body of a user would appear in an image captured by the camera. If the first user is not determined to be within the field of view of the camera, an output of the camera can continue to be monitored until the first user is detected in the field of view of the camera. However, if the first user is detected in the field of view of the camera, the method 400 can proceed from the operation 402 to an operation 404.

The operation 404 can include generating user queue data that assigns a position for the first user in a user queue. The user queue can indicate one or more priorities for one or more corresponding users that have been assigned a position in the user queue. The user queue data can indicate a position of the first user in the user queue. Additionally, or alternatively, the user queue data can identify parameters for a timer that is assigned to the first user. The timer can be established with an amount of time that indicates how long the position and/or priority will be assigned to the first user when the timer is initialized.

The method 400 can proceed from the operation 404 to the operation 406, which can include determining whether a second user is in the field of view of the camera. The camera can capture one or more images, which can be processed to determine whether the second user is in the field of view of the camera. This determination can be based on one or more facial features of the second user, voice characteristics of the user, and/or any other features of a user that can be used to authenticate a presence of a user. When the second user is not determined to be within the field of view of the camera, the method 400 can proceed from the operation 406 to the operation 408. However, when the second user is determined to be within the field of view of the camera, the method 400 can proceed from the operation 406 to the operation 410.

The operation 410 can include generating user queue data that assigns another position for the second user in the user queue data. The first user can be assigned the priority position in the user queue if the first user was determined to be within the field of view prior to the second user. However, the second user can be assigned the priority position in the user queue if the second user was determined to be within the field of view prior to the first user. Additionally, or alternatively, the positions of the first user and the second user in the user queue can be based on a current status of the user queue, which can be based on who is already identified in the user queue, the positions already assigned in the user queue, a status of each timer for each user that is already identified in the user queue, and/or any other information that can affect a status of the user queue.

The method 400 can proceed from the operation 410 to the operation 408, which can include determining whether the first user is facing the display interface of the computing device. The determination of whether the first user is facing the camera can be based on processing one or more images, audio data characterizing audio exhibited in a location of the first user, and/or any other information that can be used to determine whether a person is facing a camera. For example, the one or more images can be processed to determine whether properties of certain facial features are exhibited in the one or more images, such as a distance between the eyes of the first user and/or proportion(s) between two or more bodily features (e.g., facial features) of the first user. When the first user is determined to be facing the camera, the method 400 can proceed from the operation 408 to an operation 412. However, when the first user is not determined to be facing the camera, the method 400 can proceed from the operation 408 to an operation 414.

The operation 414 can include determining whether the second user is facing the display interface of the computing device. The determination of whether the second user is facing the camera can be based on processing one or more images, audio data characterizing audio exhibited in a location of the second user, and/or any other information that can be used to determine whether a person is facing a camera. For example, the one or more images can be processed to determine whether properties of certain facial features are exhibited in the one or more images, such as a distance between the eyes of the second user and/or proportion(s) between two or more bodily features (e.g., facial features) of the second user. When the second user is determined to be facing the camera, the method 400 can proceed from the operation 414 to the operation 412. However, when the second user is determined to not be facing the camera, the method 400 can proceed, via continuation element "A" to an operation 416 of the method 420.

The operation 412 can include causing the display interface to render personalized content for a user facing the display interface and/or a user having the highest assigned priority in the user queue. For example, when both the first user and the second user are determined to be facing the display interface, but the first user has priority over the second user in the user queue (e.g., because the first user entered the field of view before the second user), the content rendered at the display interface can be personalized to the first user. Additionally, or alternatively, when the first user is determined to be facing the display interface and the second user is determined to not be facing the display interface, and the first user is assigned priority over the second user in the user queue, the content rendered at the display interface can be personalized for the second user. The method 400 can proceed from the operation 412, via continuation element "B," to an operation 424 of method 420.

Referring back to the operation 416, the method 420 can include the operation 416, which can include determining whether the first user has left the field of view of the camera. If the first user has left the field of view of the camera, the method 420 can proceed from the operation 416 to the operation 422. However, if the first user has not left the field of view of the camera, the method 420 can proceed from the operation 416 to an operation 418. The operation 418 can include determining whether the second user has left the field of view of the camera. When the second user is determined to have left the field of view of the camera, the method 420 can proceed from the operation 418 to the operation 422. However, when the second user is determined to have not left the field of view of the camera, the method 420 can proceed from the operation 418, via continuation element "C," back to the operation 402 of the method 400.

The operation 422 can be an optional operation that includes deducting an amount of time from a time corresponding to one or more users that have left the field of view. In some implementations, the amount of time deducted can be a static amount. In other implementations, the amount of time deducted from the timer can be dynamic and selected based upon historical interactions between the respective user and the automated assistant, the amount of time that the user has been within the field of view, the amount of time that the user has been facing the display interface, an amount of time that is left on a respective timer, a number of persons in the field of view, a number of action notifications that have been identified for a respective user, and/or any other basis from which to modify a timer.

The method 420 can proceed from the optional operation 422 to an operation 428. The operation 428 can include initializing a timer corresponding a user that has left the field of view of the camera. A timer for the first user, a timer for the second user, and/or a timer for any other number of users, can be initialized at a starting time that is defined by the user queue data. Additionally, or alternatively, the starting time for the timer can be based on a particular amount of time resulting from the deduction of time from the timer at the operation 422.

Referring to continuation element "B," the method 420 can proceed from the operation 412 of the method 400 to an operation 424 of the method 420. The operation 424 can include determining whether the first user is no longer facing the display interface. When the first user is determined to no longer be facing the display interface, the method 420 can proceed from the operation 424 to the operation 428. However, when the first user is determined to still be facing the display interface, the method 420 can proceed from the operation 424 to an operation 426. The operation 426 can include determining whether the second user is no longer facing the display interface. When the second user is determined to no longer be facing the camera, the method 420 can proceed from the optional operation 422 to the operation 428. However, when the second user is determined to still be facing the camera, the method 420 can proceed from the operation 426, via continuation element "C," to the operation 402.

Referring to the operation 428, when the timer is initialized at the operation 428, the method 420 can proceed from the operation 420 to an operation 430. The operation 430 can include determining whether the timer(s) for one or more users has expired. When a timer for a particular user is determined to have expired, the method 420 can proceed from the operation 430 to an operation 432. However, when a timer for a particular user is determined to have not expired, the method 420 can proceed from the operation 430, via continuation element "C," to the operation 402. The operation 432 can be an operational operation that includes removing a user corresponding to the expired timer from the user queue and/or removing corresponding content from the display interface. In this way, any person that is next in the user queue can be increased in position towards the priority position. Furthermore, this can automatically preserve privacy by removing any personalized content directed toward the first user and/or the second user, when a different user has been designated as the priority user in the user queue.

Figure 5:
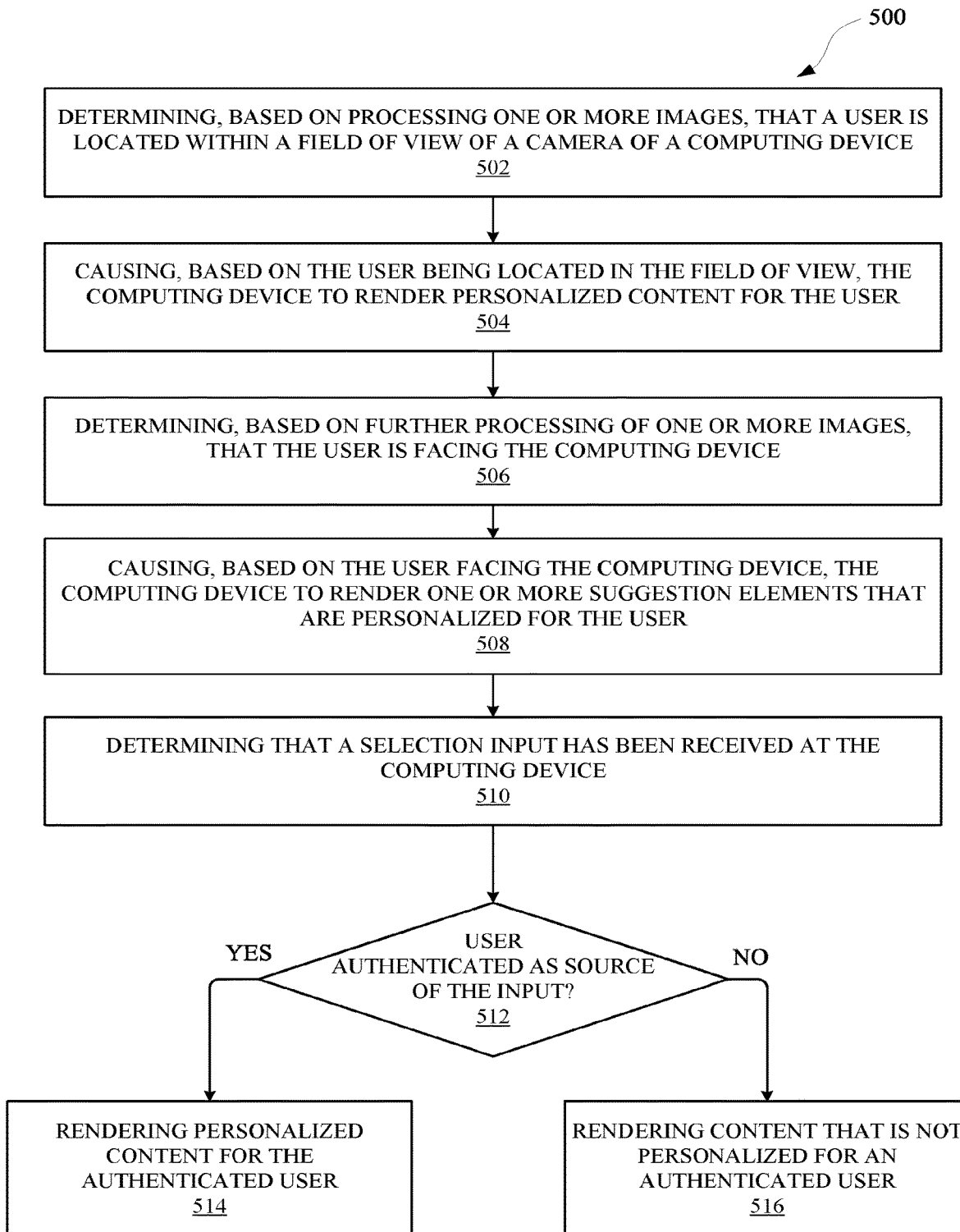
FIG. 5 illustrates a method for authenticating a user input received, at a computing device, from a user that is in the presence of multiple users that have been acknowledged by the computing device.

FIG. 5 illustrates a method 500 for authenticating a user input received, at a computing device, from a user that is in the presence of multiple users that have been acknowledged by the computing device. The method 500 can be performed by one or more computing devices, applications, and/or any other apparatus or module capable of being responsive to a user input. The method 500 can include an operation 502 of determining, based on processing one or more images, that a user is located within a field of view of a camera of a computing device. When the user is determined to be located within the field of view of the camera, the computing device can perform an operation 504. The operation 504 can include causing, based on the user being located in the field of view, the computing device to render personalized content for the user. When the personalized content is being provided at the computing device, the computing device can perform an operation 506 of determining, based on further processing of one or more images, that the user is facing the computing device.

When the user is determined to be facing the computing device, the method 500 can proceed to an operation 508 of causing, based on the user facing the computing device, the computing device to render one or more suggestion elements that are personalized for the user. For example, the one or more suggestion elements can be based on data that is generated based on previous interactions between the user and the automated assistant. When the one or more suggestions elements are being rendered by the computing device, the computing device can perform an operation 510 of determining that a selection input has been received at the computing device. The selection input can be a touch input at a touch display panel that is connected to the computing device.

The method 500 can include an operation 512 of determining whether the source of the selection input has been correlated to an authenticated user. For example, the computing device can verify a facial signature of a user that is within a threshold distance of the computing device in order to correlate the selection input to the user. When the user is authenticated as the source of the selection input, the computing device can perform the operation 514 of rendering personalized content for the authenticated user. However, when the user is not authenticated as the source of the selection input, the operation 516 can be performed. The operation 516 can include rendering content that is not personalized for an authenticated user.

Figure 6:
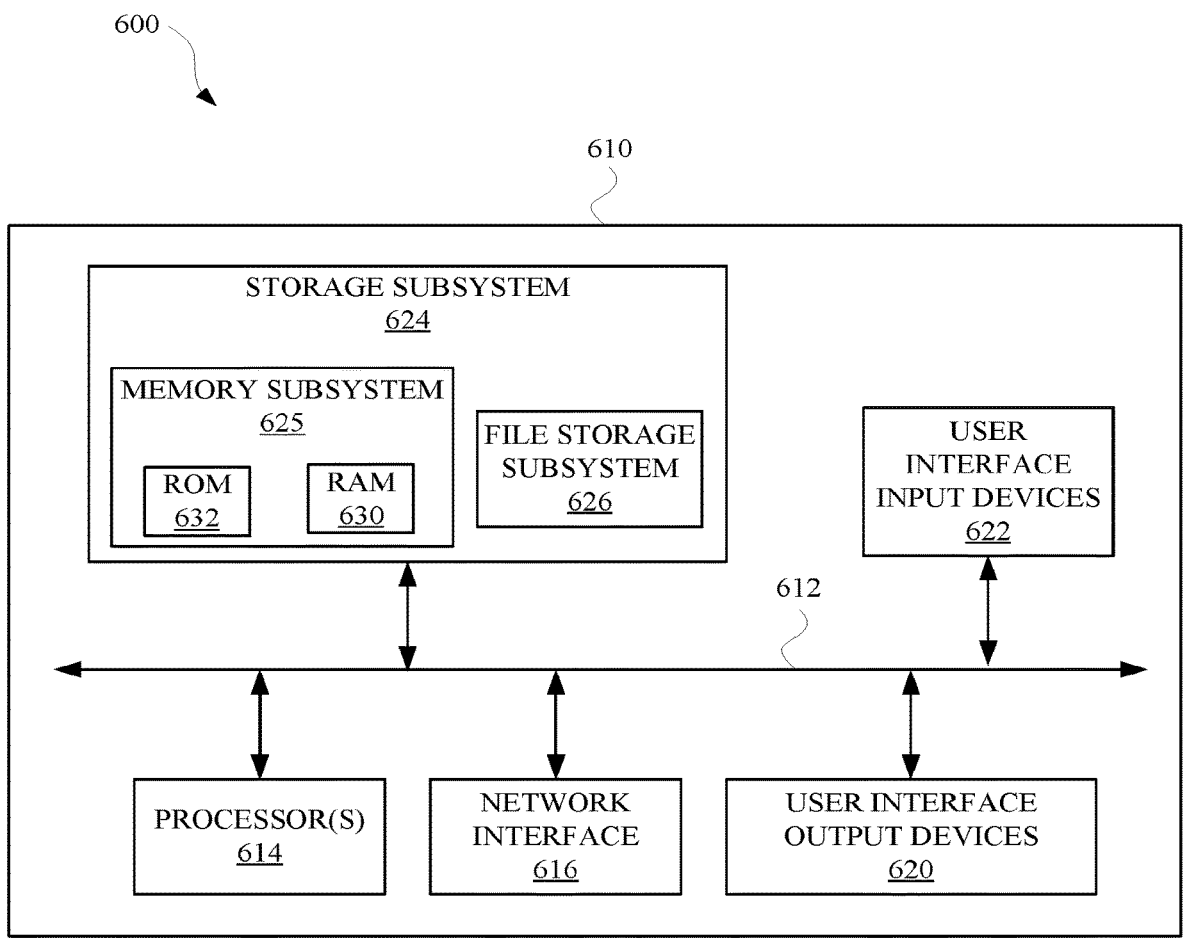
FIG. 6 is a block diagram of an example computer system.

FIG. 6 is a block diagram of an example computer system 610. Computer system 610 typically includes at least one processor 614 which communicates with a number of peripheral devices via bus subsystem 612. These peripheral devices may include a storage subsystem 624, including, for example, a memory 625 and a file storage subsystem 626, user interface output devices 620, user interface input devices 622, and a network interface subsystem 616. The input and output devices allow user interaction with computer system 610. Network interface subsystem 616 provides an interface to outside networks and is coupled to corresponding interface devices in other computer systems.

User interface input devices 622 may include a keyboard, pointing devices such as a mouse, trackball, touchpad, or graphics tablet, a scanner, a touchscreen incorporated into the display, audio input devices such as voice recognition systems, microphones, and/or other types of input devices. In general, use of the term "input device" is intended to include all possible types of devices and ways to input information into computer system 610 or onto a communication network.

User interface output devices 620 may include a display subsystem, a printer, a fax machine, or non-visual displays such as audio output devices. The display subsystem may include a cathode ray tube (CRT), a flat-panel device such as a liquid crystal display (LCD), a projection device, or some other mechanism for creating a visible image. The display subsystem may also provide non-visual display such as via audio output devices. In general, use of the term "output device" is intended to include all possible types of devices and ways to output information from computer system 610 to the user or to another machine or computer system.

Storage subsystem 624 stores programming and data constructs that provide the functionality of some or all of the modules described herein. For example, the storage subsystem 624 may include the logic to perform selected aspects of method 400 and method 420, method 500, and/or to implement one or more of system 300, computing device 102, computing device 202, and/or any other application, device, apparatus, and/or module discussed herein.

These software modules are generally executed by processor 614 alone or in combination with other processors. Memory 625 used in the storage subsystem 624 can include a number of memories including a main random access memory (RAM) 630 for storage of instructions and data during program execution and a read only memory (ROM) 632 in which fixed instructions are stored. A file storage subsystem 626 can provide persistent storage for program and data files, and may include a hard disk drive, a floppy disk drive along with associated removable media, a CD-ROM drive, an optical drive, or removable media cartridges. The modules implementing the functionality of certain implementations may be stored by file storage subsystem 626 in the storage subsystem 624, or in other machines accessible by the processor(s) 614.

Bus subsystem 612 provides a mechanism for letting the various components and subsystems of computer system 610 communicate with each other as intended. Although bus subsystem 612 is shown schematically as a single bus, alternative implementations of the bus subsystem may use multiple busses.

Computer system 610 can be of varying types including a workstation, server, computing cluster, blade server, server farm, or any other data processing system or computing device. Due to the ever-changing nature of computers and networks, the description of computer system 610 depicted in FIG. 6 is intended only as a specific example for purposes of illustrating some implementations. Many other configurations of computer system 610 are possible having more or fewer components than the computer system depicted in FIG. 6.

In situations in which the systems described herein collect personal information about users (or as often referred to herein, "participants"), or may make use of personal information, the users may be provided with an opportunity to control whether programs or features collect user information (e.g., information about a user's social network, social actions or activities, profession, a user's preferences, or a user's current geographic location), or to control whether and/or how to receive content from the content server that may be more relevant to the user. Also, certain data may be treated in one or more ways before it is stored or used, so that personal identifiable information is removed. For example, a user's identity may be treated so that no personal identifiable information can be determined for the user, or a user's geographic location may be generalized where geographic location information is obtained (such as to a city, ZIP code, or state level), so that a particular geographic location of a user cannot be determined. Thus, the user may have control over how information is collected about the user and/or used.

While several implementations have been described and illustrated herein, a variety of other means and/or structures for performing the function and/or obtaining the results and/or one or more of the advantages described herein may be utilized, and each of such variations and/or modifications is deemed to be within the scope of the implementations described herein. More generally, all parameters, dimensions, materials, and configurations described herein are meant to be exemplary and that the actual parameters, dimensions, materials, and/or configurations will depend upon the specific application or applications for which the teachings is/are used. Those skilled in the art will recognize, or be able to ascertain using no more than routine experimentation, many equivalents to the specific implementations described herein. It is, therefore, to be understood that the foregoing implementations are presented by way of example only and that, within the scope of the appended claims and equivalents thereto, implementations may be practiced otherwise than as specifically described and claimed. Implementations of the present disclosure are directed to each individual feature, system, article, material, kit, and/or method described herein. In addition, any combination of two or more such features, systems, articles, materials, kits, and/or methods, if such features, systems, articles, materials, kits, and/or methods are not mutually inconsistent, is included within the scope of the present disclosure.

In some implementations, a method is provided that includes processing, at a computing device, a first set of one or more images captured by a camera that is connected to the computing device. In some instances, the computing device provides access to an automated assistant. The method further includes determining, based on processing the first set of one or images, that a first user is located within a field of view of the camera and is facing a display interface of the computing device, generating, based on determining that the first user is located within the field of view of the camera, user queue data that assigns the first user with a position in a priority queue and characterizes a timer that, when initialized, gradually decreases an amount of time remaining for the first user to be assigned their respective position in the priority queue, processing, at the computing device and subsequent to generating the user queue data, a second set of one or more images captured by the camera, and determining, based on processing the second set of one or more images, that a second user is located within the field of view of the camera and that the first user is no longer facing the display interface of the computing device. The method further includes causing, based on determining that the second user is located within the field of view of the camera of the computing device, the user queue data to indicate that the second user is assigned the position in the priority queue and the first user is assigned another position in the priority queue, and causing, based on determining that the first user is no longer facing the display interface of the computing device, the timer to initialize in order to gradually decrease the amount of time remaining for the first user to be assigned the other position in the priority queue.

These and other implementations of the technology may include one or more of the following features.

In some implementations, the method may further include prior to determining that the first user is no longer facing the display interface of the computing device, causing, based on determining that the first user is facing the display interface of the computing device, the display interface to render personalized content that is based on content data associated with the first user. In some implementations, the method may further include subsequent to determining that the first user is no longer facing the display interface of the computing device, causing, based on determining that the first user is no longer facing the display interface of the computing device, the display interface to no longer render the personalized content that is based on the content data associated with the first user.

In some of those implementations, the personalized content may identify a notification that is associated with an application that is separate from the automated assistant, and the content data is provided by the application. In some of those further implementations, the method may include prior to determining that the first user is no longer facing the display interface of the computing device, generating, based on historical interaction data characterizing one or more interactions between the first user and the automated assistant, the content data. In yet further implementations, generating the content data may include determining that the historical interaction data identifies other content that was previously rendered at the display interface of the computing device when the first user was facing the display interface and/or when the first user provided an input to the computing device. In some instances, the content data may be void of the other content.

In some implementations, the method may further include causing, based on determining that the first user is located within the field of view of the camera, the display interface of the computing device to render a graphical element symbolizing the position being assigned to the first user, and when the first user is no longer facing the display interface of the computing device, and when the amount of time remaining for the first user to be assigned the other position has transpired, causing the display interface of the computing device to no longer render the graphical element symbolizing the position being assigned to the first user.

In some implementations, the method may further include when the first user is no longer facing the display interface of the computing device, and when the amount of time remaining for the first user to be assigned the other position has transpired, causing the display interface of the computing device to render another graphical element symbolizing the position being assigned to the second user.

In some implementations, the method may further include determining, based on processing the second set of one or more images, a distance of the second user relative to the display interface of the computing device, receiving, subsequent to determining that the second user is within the field of view of the camera, a touch input at the display interface of the computing device, and, when the distance of the second user relative to the display interface satisfies a proximity threshold, causing, based on the distance of the second user satisfying the proximity threshold, the display interface to render personalized content using content data that is associated with the second user.

In some implementations, the method may further include determining, based on processing the second set of one or more images, a distance of the second user relative to the display interface of the computing device, receiving, subsequent to determining that the second user is within the field of view of the camera, a touch input at the display interface of the computing device, and, when the distance of the second user relative to the display interface does not satisfy a proximity threshold, causing, based on the distance of the second user satisfying the proximity threshold, the display interface to render content using guest-user content data.

In some implementations, determining that the first user is facing the display interface of the computing device may include determining a separate amount of time that the first user is facing the display interface satisfies a gaze threshold.

In some implementations, a method is provided that includes processing, at a computing device, a first set of one or more images captured by a camera that is connected to the computing device. In some instances, the computing device provides access to an automated assistant. The method further includes, determining, based on processing the first set of one or images, that a first user is located within the field of view of the camera, generating, based on determining that the first user is located within the field of view of the camera, user queue data that assigns the first user with a position in a priority queue and characterizes a timer that, when initialized, gradually decreases an amount of time remaining for the first user to be assigned their respective position in the priority queue, processing, at the computing device and subsequent to generating the user queue data, a second set of one or more images captured by the camera, determining, based on processing the second set of one or more images, that a second user is located within the field of view of the camera, and causing, based on determining that the second user is located within the field of view of the camera, the user queue data to identify the second user as being assigned another position in the priority queue. In some instances, the position assigned to the first user is prioritized over the other position assigned to the second user. The method further includes processing, at the computing device and subsequent to generating the other user queue data, a third set of one or more images captured by the camera, and determining, based on processing the third set of one or more images captured by the camera, whether the field of view of the camera includes the first user and/or the second user. The method further includes, when the field of view of the camera is determined to include the second user but not include the first user, causing, based on the field of view of the camera being determined to include the second user but not include the first user: the user queue data to indicate that the second user is assigned the position in the priority queue and the first user is assigned the other position in the priority queue, and the timer to initialize in order to gradually decrease the amount of time remaining for the first user to be assigned the other position in the priority queue.

These and other implementations of the technology may include one or more of the following features.

In some implementations, the method may further include determining, based on processing the third set of one or more images captured by the camera, whether the first user and/or the second user are facing a display interface of the computing device, and, when the field of view of the camera is determined to include the second user but not the first user, and the second user is determined to be facing the camera, causing the display interface to render personalized content that is based on content data associated with the second user.

In some of those implementations, causing the user queue data to identify the second user as being assigned another position in the priority queue may include causing the user queue data to characterize another timer that, when initialized, gradually decreases another amount of time remaining for the second user to be assigned their respective other position in the priority queue. In some of those implementations, the method may further include when the field of view of the camera is determined to include the second user but not the first user, and the second user is determined to no longer be facing the display interface of the computing device, causing the other timer to initialize in order to gradually decrease the other amount of time remaining for the second user to be assigned the position in the priority queue.

In some implementations, the method may further include, when the field of view of the camera is determined to include the second user but not the first user, and the second user is determined to be facing the display interface of the computing device, causing the display interface of the computing device to render a graphical element symbolizing the position being assigned to the second user in the priority queue.

In some implementations, the method may further include causing, in response to determining that the first user is located within the field of view of the camera, the display interface of the computing device to render another graphical element symbolizing the other position being assigned to the first user, and, when the field of view of the camera is determined to include the second user but not the first user queue data, and when the amount of time remaining for the first user to be assigned the other position has transpired, causing the display interface of the computing device to no longer render the other graphical element symbolizing the other position being assigned to the first user.

In some implementations, the method may further include, subsequent to the timer initializing in order to gradually decrease the amount of time remaining for the first user to be assigned the other position in the priority queue, determining, based on processing another set of one or more images captured by the camera, whether the field of view of the camera includes the first user and/or the second user, and, when the field of view of the camera is determined to include the first user, causing the amount of time for the timer to be reset to a non-zero value.

In some implementations, a method is provided that includes processing, at a computing device, one or more images captured by a camera that is connected to the computing device. In some instances, the computing device provides access to an automated assistant. The method further includes determining, based on processing the one or images, that a user is located within a field of view of the camera. In some instances, the user is associated with personalized content that is accessible via the automated assistant. The method further includes generating, based on determining that the first user is located within the field of view of the camera, user queue data that assigns priority to the user and characterizes a timer that, in real-time, gradually decreases an amount of time remaining for the user to be assigned the priority, determining, based on processing the one or more images, a distance of the user from the camera that is connected to the computing device, and, subsequent to generating the user queue data and while at least some amount of time remains for the user to be assigned the priority, determining that an input has been provided to an interface of the computing device. The method further includes, when the distance of the user from the camera satisfies a proximity threshold, causing, in response to the input being provided to the interface of the computing device, the computing device to render content that includes the personalized content, and, when the distance of the user from the camera does not satisfy the proximity threshold, causing, in response to the input being provided to the interface of the computing device, the computing device to render content that does not include the personalized content.

These and other implementations of the technology may include one or more of the following features.

In some implementations, the method may further include the timer may be initialized in response to determining that the user is within the field of view of the camera, and the method may further include, subsequent to the amount of time remaining for the user to be assigned the priority expiring, determining that another input has been provided to the interface of the computing device, and causing, in response to the other input being provided to the interface of the computing device and based on the amount of time for the timer expiring, the computing device to render other content that does not include the personalized content.

In some implementations, the method may further include, when the priority remains assigned to the user and the distance of the user from the camera satisfies the proximity threshold, causing the amount of time to be increased in furtherance of causing the priority to be assigned to the user for an additional amount of time.

In some implementations, a method is provided that includes rendering, at a touch-screen of a client device, both: a first selectable element that includes at least part of first access-restricted content for a first user account and that, when selected, conditionally provides access to a first additional portion of the first access-restricted content and/or enables editing of the first access-restricted content, and a second selectable element that includes at least part of second access-restricted content for a second user account and that, when selected, conditionally provides access to a second additional portion of the second access-restricted content and/or enables editing of the second access-restricted content. The method further includes detecting a touch-input, at the touch-screen, that corresponds to a selection of the first selectable element, and processing one or more images captured by a camera of the client device to determine: that a user captured by one or more of the images corresponds to the first user account, and a distance of the user relative to the client device. The method further includes determining, based on the distance of the user and based on determining that the user corresponds to the first user account, to render, at the touch-screen, the first additional portion of the first access-restricted content and/or an interface that enables editing of the first access-restricted content.

These and other implementations of the technology may include one or more of the following features.

In some implementations, determining, based on the distance of the user and based on determining that the user corresponds to the first user account, to render the first additional portion and/or the interface may include determining to render the first additional portion and/or the interface based on the distance satisfying a distance threshold. In some of those implementations determining, based on the distance of the user and based on determining that the user corresponds to the first user account, to render the first additional portion and/or the interface may additionally and/or alternatively include determining that the distance of the user is closer to the client device than any additional distance of any additional user detected in one or more of the image frames.

In some implementations, determining that the user captured by one or more of the images corresponds to the first user account may include processing one or more of the images using a facial recognition model stored locally at the client device to generate a face embedding, comparing the face embedding to an embedding, for the first user account, that is stored locally at the client device, and determining that the user corresponds to the first user account based on the comparison.

In some implementations, the method may further include, prior to rendering both the first selectable element and the second selectable element, processing one or more prior images from the camera to determine that the user that corresponds to the first user account is present in one or more of the prior images and to determine that the user that corresponds to the second user account is present in one or more of the prior images. In some instances, rendering both the first selectable element and the second selectable element may be responsive to determining that the user that corresponds to the first user account is present in one or more of the prior images and to determining that the user that corresponds to the second user account is present in one or more of the prior images.

In some implementations, processing the one or more images captured by the camera of the client device to determine that the user captured by one or more of the images corresponds to the first user account, and the distance of the user relative to the client device, may occur responsive to detecting the touch-input. In some instances, one or more of the images may optionally be buffered prior to detecting the touch-input.

Other implementations may include a non-transitory computer readable storage medium and/or a computer program storing instructions executable by one or more processors (e.g., central processing unit(s) (CPU(s)), graphics processing unit(s) (GPU(s)), and/or tensor processing unit(s) (TPU(s)) to perform a method such as one or more of the methods described above and/or elsewhere herein. Yet other implementations may include a system having one or more processors operable to execute stored instructions to perform a method such as one or more of the methods described above and/or elsewhere herein.

It should be appreciated that all combinations of the foregoing concepts and additional concepts described in greater detail herein are contemplated as being part of the subject matter disclosed herein. For example, all combinations of claimed subject matter appearing at the end of this disclosure are contemplated as being part of the subject matter disclosed herein.

We claim:

1. A method implemented by one or more processors, the method comprising:
   processing, at a computing device, one or more images captured by a camera that is connected to the computing device, wherein the computing device provides access to an automated assistant;
   determining, based on processing the one or more images, that a user is located within a field of view of the camera, wherein the user is associated with personalized content that is accessible via the automated assistant and wherein determining that the user is located within the field of view of the camera comprises:
      processing one or more of the images using a facial recognition model stored locally at the computing device to generate a face embedding;
      comparing the face embedding to an embedding, for a corresponding user account of the user, that is stored locally at the computing device; and
      determining that the user is associated to the user account based on the comparison;
   determining that an input has been provided to an interface of the computing device; and
   in response to determining that the input has been provided to the interface of the computing device:
      determining a distance of the user from the computing device; and
      when the distance of the user from the computing device satisfies a proximity threshold:
         causing, in response to the input being provided to the interface of the computing device, the computing device to render content that includes the personalized content, and
      when the distance of the user from the camera does not satisfy the proximity threshold:
         causing, in response to the input being provided to the interface of the computing device, the computing device to render content that does not include the personalized content.

2. The method of claim 1, further comprising:
   causing, based on determining that the distance of the user from the computing device satisfies the proximity threshold, a timer to initialize in order to gradually decrease an amount of time remaining for the user to provide the input, wherein causing the computing device to render content that includes the personalized content is further based on determining that the timer has not expired, and wherein causing the computing device to render content that does not include the personalized content is further based on determining that the timer has expired.

3. The method of claim 1, further comprising:
   determining whether the user is facing the camera, wherein causing the computing device to render content that includes the personalized content is further based on determining that the user is facing the camera, and wherein causing the computing device to render content that does not include the personalized content is further based on determining that the user is not facing the camera.

4. The method of claim 3, further comprising:
   prior to determining that the user is no longer facing a display interface of the computing device:
      generating, based on historical interaction data characterizing one or more interactions between the first user and the automated assistant, the content.

5. The method of claim 1, wherein causing the computing device to render content that does not include the personalized content is further performed when a second user is detected in the one or more images.

6. The method of claim 1, wherein the personalized content of the user includes a calendar interface for a calendar application of the user.

7. The method of claim 1, wherein the personalized content identifies a notification that is associated with an application that is separate from the automated assistant, and the content data is provided by the application.

8. The method of claim 1, further comprising:
   determining the personalized content that is accessible via the automated assistant based on the user account.

9. A computing device, comprising:
   a camera;
   one or more processors; and
   memory configured to store instructions that, when executed by the one or more processors cause the one or more processors to:
      process one or more images captured by the camera;
      determine, based on processing the one or more images, that a user is located within a field of view of the camera, wherein the user is associated with personalized content, and wherein the personalized content of the user includes a calendar interface for a calendar application of the user;
      determine that an input has been provided to an interface of the computing device; and
      in response to determining that the input has been provided to the interface of the computing device:
         determine a distance of the user from the computing device; and
         when the distance of the user from the computing device satisfies a proximity threshold:
            cause, in response to the input being provided to the interface of the computing device, the computing device to render content that includes the personalized content, and
         when the distance of the user from the camera does not satisfy the proximity threshold:
            cause, in response to the input being provided to the interface of the computing device, the computing device to render content that does not include the personalized content.

10. The computing device of claim 9, wherein the instructions, when executed by the one or more processors, further cause one or more of the processors to:
   cause, based on determining that the distance of the user from the computing device satisfies the proximity threshold, a timer to initialize in order to gradually decrease an amount of time remaining for the user to provide the input, wherein causing the computing device to render content that includes the personalized content is further based on determining that the timer has not expired, and wherein causing the computing device to render content that does not include the personalized content is further based on determining that the timer has expired.

11. The computing device of claim 9, wherein the instructions, when executed by the one or more processors, further that cause one or more of the processors to:
determine whether the user is facing the camera, wherein causing the computing device to render content that includes the personalized content is further based on determining that the user is facing the camera, and wherein causing the computing device to render content that does not include the personalized content is further based on determining that the user is not facing the camera.

12. The computing device of claim 9, wherein the instructions, when executed by the one or more processors, further that cause one or more of the processors to:
prior to determining that the user is no longer facing a display interface of the computing device:
generate, based on historical interaction data characterizing one or more interactions between the first user and an automated assistant, the content.

13. The computing device of claim 9, wherein causing the computing device to render content that does not include the personalized content is further performed when a second user is detected in the one or more images.

14. A non-transitory processor-readable medium having instructions stored thereon, which when executed by one or more processors, cause the one or more processors to implement a method, comprising:
processing, at a computing device, one or more images captured by a camera that is connected to the computing device, wherein the computing device provides access to an automated assistant;
determining, based on processing the one or more images, that a user is located within a field of view of the camera, wherein the user is associated with personalized content that is accessible via the automated assistant;
determining that an input has been provided to an interface of the computing device; and
in response to determining that the input has been provided to the interface of the computing device:
determining a distance of the user from the computing device; and
when the distance of the user from the computing device satisfies a proximity threshold:
causing, in response to the input being provided to the interface of the computing device, the computing device to render content that includes the personalized content, wherein causing the computing device to render the content that includes the personalized content is further based on determining that the user is facing the camera; and
when the distance of the user from the camera does not satisfy the proximity threshold:
causing, in response to the input being provided to the interface of the computing device, the computing device to render content that does not include the personalized content, wherein causing the computing device to render the content that does not include the personalized content is further based on determining that the user is not facing the camera.

15. The non-transitory processor-readable medium of claim 14, wherein the method further includes:
causing, based on determining that the distance of the user from the computing device satisfies the proximity threshold, a timer to initialize in order to gradually decrease an amount of time remaining for the user to provide the input, wherein causing the computing device to render content that includes the personalized content is further based on determining that the timer has not expired, and wherein causing the computing device to render content that does not include the personalized content is further based on determining that the timer has expired.

16. The non-transitory processor-readable medium of claim 14, wherein the method further includes:
prior to determining that the user is no longer facing the display interface of the computing device:
generating, based on historical interaction data characterizing one or more interactions between the first user and the automated assistant, the content.

17. The non-transitory processor-readable medium of claim 14, wherein causing the computing device to render content that does not include the personalized content is further performed when a second user is detected in the one or more images.

18. A method implemented by one or more processors, the method comprising:
processing, at a computing device, one or more images captured by a camera that is connected to the computing device, wherein the computing device provides access to an automated assistant;
determining, based on processing the one or more images, that a user is located within a field of view of the camera, wherein the user is associated with personalized content that is accessible via the automated assistant;
determining that an input has been provided to an interface of the computing device; and
in response to determining that the input has been provided to the interface of the computing device:
determining a distance of the user from the computing device; and
when the distance of the user from the computing device satisfies a proximity threshold:
causing, in response to the input being provided to the interface of the computing device, the computing device to render content that includes the personalized content, wherein the personalized content identifies a notification that is associated with an application that is separate from the automated assistant, and the content data is provided by the application and
when the distance of the user from the camera does not satisfy the proximity threshold:
causing, in response to the input being provided to the interface of the computing device, the computing device to render content that does not include the personalized content.

19. A method implemented by one or more processors, the method comprising:
processing, at a computing device, one or more images captured by a camera that is connected to the computing device, wherein the computing device provides access to an automated assistant;
determining, based on processing the one or more images, that a user is located within a field of view of the camera, wherein the user is associated with personalized content that is accessible via the automated assistant;
determining that an input has been provided to an interface of the computing device; and
in response to determining that the input has been provided to the interface of the computing device:

determining a distance of the user from the computing device;

when the distance of the user from the computing device satisfies a proximity threshold:

causing, in response to the input being provided to the interface of the computing device, the computing device to render content that includes the personalized content, and when the distance of the user from the camera does not satisfy the proximity threshold:

causing, in response to the input being provided to the interface of the computing device, the computing device to render content that does not include the personalized content, wherein causing the computing device to render content that does not include the personalized content is further performed when a second user is detected in the one or more images.

\* \* \* \* \*